United States Patent
Provost et al.

(10) Patent No.: US 7,216,012 B2
(45) Date of Patent: May 8, 2007

(54) AUCTION SYSTEMS AND METHODS FOR SELECTING INSERTS FOR DIRECT MAILINGS

(75) Inventors: Christina Provost, Omaha, NE (US); Dan Oswald, Papillion, NE (US)

(73) Assignee: First Data Corporation, Englewood, CO (US)

( * ) Notice: Subject to any disclaimer, the term of this patent is extended or adjusted under 35 U.S.C. 154(b) by 198 days.

(21) Appl. No.: 11/115,079

(22) Filed: Apr. 25, 2005

(65) Prior Publication Data

US 2005/0261996 A1    Nov. 24, 2005

Related U.S. Application Data

(63) Continuation-in-part of application No. 10/655,818, filed on Sep. 5, 2003, now Pat. No. 6,895,302, which is a continuation-in-part of application No. 10/417,887, filed on Apr. 14, 2003, now Pat. No. 6,829,519.

(51) Int. Cl.
    G06F 7/00    (2006.01)
    B07C 5/00    (2006.01)
    G06K 9/00    (2006.01)

(52) U.S. Cl. .................. 700/220; 700/222; 209/584
(58) Field of Classification Search ............. 700/220, 700/222, 223; 270/58.31, 58.32; 209/584
    See application file for complete search history.

(56) References Cited

U.S. PATENT DOCUMENTS

| | | | |
|---|---|---|---|
| 2,362,134 A | 11/1944 | Honig | |
| 3,717,337 A | 2/1973 | McCain et al. | |
| 3,773,314 A | 11/1973 | Giovannini | |
| 3,905,593 A | 9/1975 | Behn | |
| 4,060,228 A | 11/1977 | Tress et al. | |
| 4,511,132 A | 4/1985 | Muller | |
| 4,527,793 A | 7/1985 | Bottcher et al. | |
| 4,577,848 A | 3/1986 | Hams | |
| 4,634,107 A | 1/1987 | Vandersyde et al. | |
| 4,643,705 A | 2/1987 | Bober | |
| 4,697,246 A | 9/1987 | Zemke et al. | |
| 4,718,657 A | 1/1988 | Otter et al. | |
| 4,753,430 A | 6/1988 | Rowe et al. | |
| 4,905,977 A | 3/1990 | Viojuk | |
| 5,034,985 A | 7/1991 | Keough | |

(Continued)

FOREIGN PATENT DOCUMENTS

EP    0 621 563 A1    10/1994

OTHER PUBLICATIONS

U.S. Appl. No. 10/028,888, filed Dec. 19, 2001, Nowlin.

(Continued)

Primary Examiner—Gene O. Crawford
Assistant Examiner—Ramya Prakasam
(74) Attorney, Agent, or Firm—Townsend and Townsend and Crew LLP

(57) ABSTRACT

A method of allocating excess space associated with a primary component includes determining the excess space associated with the primary component, identifying at least one information insert compatible with the excess space, providing an output advertising the excess space, and receiving a request in response to the output. The request may be based at least in part on the at least one information insert. The method also includes associating the at least one information insert with the primary component.

20 Claims, 11 Drawing Sheets

U.S. PATENT DOCUMENTS

| | | | |
|---|---|---|---|
| 5,076,556 | A | 12/1991 | Mandel |
| 5,082,268 | A | 1/1992 | Santoro |
| 5,088,711 | A | 2/1992 | Newsome |
| 5,125,214 | A | 6/1992 | Orsinger et al. |
| 5,144,562 | A | 9/1992 | Stikkelorum et al. |
| 5,171,005 | A | 12/1992 | Manley et al. |
| 5,177,687 | A | 1/1993 | Baggarly et al. |
| 5,220,770 | A | 6/1993 | Szewczyk et al. |
| 5,264,665 | A | 11/1993 | Delfer, III |
| RE34,483 | E | 12/1993 | Bowman et al. |
| 5,317,654 | A | 5/1994 | Perry et al. |
| 5,327,701 | A | 7/1994 | Dronsfield |
| 5,388,815 | A | 2/1995 | Hill et al. |
| 5,510,997 | A | 4/1996 | Hines et al. |
| 5,647,583 | A | 7/1997 | Emigh et al. |
| 5,659,481 | A | 8/1997 | Qutub et al. |
| 5,667,210 | A | 9/1997 | DeLise, Jr. |
| 5,704,602 | A | 1/1998 | Taylor et al. |
| 5,709,374 | A | 1/1998 | Taylor et al. |
| 5,722,221 | A | 3/1998 | Maltman et al. |
| 5,724,791 | A | 3/1998 | Pishny et al. |
| 5,730,299 | A | 3/1998 | Helsley |
| 5,745,590 | A | 4/1998 | Pollard et al. |
| 5,754,434 | A | 5/1998 | Delfer et al. |
| 5,777,883 | A | 7/1998 | Lau et al. |
| 5,818,724 | A | 10/1998 | Brewster et al. |
| 5,896,725 | A | 4/1999 | Lundstrom et al. |
| 6,032,122 | A | 2/2000 | Gertner et al. |
| 6,074,332 | A | 6/2000 | Helmstadter et al. |
| 6,094,894 | A | 8/2000 | Yates |
| 6,119,051 | A | 9/2000 | Anderson et al. |
| 6,131,053 | A * | 10/2000 | Nyffenegger et al. ....... 700/220 |
| 6,135,292 | A | 10/2000 | Pettner |
| 6,164,043 | A | 12/2000 | Miller et al. |
| 6,202,005 | B1 | 3/2001 | Mahaffey |
| 6,266,575 | B1 | 7/2001 | Anderson et al. |
| 6,267,366 | B1 | 7/2001 | Graushar et al. |
| 6,273,411 | B1 | 8/2001 | Vijuk |
| 6,276,677 | B1 | 8/2001 | Hommochi et al. |
| 6,309,336 | B1 | 10/2001 | Muessig et al. |
| 6,327,515 | B1 | 12/2001 | Shea et al. |
| 6,349,242 | B2 | 2/2002 | Mahaffey |
| 6,623,415 | B2 | 9/2003 | Gates et al. |
| 6,670,569 | B2 | 12/2003 | Smith et al. |
| 6,711,462 | B2 | 3/2004 | Flores et al. |
| 6,714,835 | B1 | 3/2004 | Hart et al. |
| 6,779,319 | B2 | 8/2004 | Smith et al. |
| 6,802,500 | B2 | 10/2004 | Bennett et al. |
| 6,829,519 | B2 | 12/2004 | Liberty et al. |
| 6,895,302 | B2 | 5/2005 | Provost et al. |
| 2003/0115160 | A1 | 6/2003 | Nowlin |
| 2004/0007510 | A1 * | 1/2004 | Kechel ...................... 209/584 |
| 2005/0261801 | A1 * | 11/2005 | Smith et al. ................ 700/221 |
| 2006/0102531 | A1 * | 5/2006 | Conard et al. .............. 209/584 |

OTHER PUBLICATIONS

Unknown Authur, *HCL Infosystems to market Pitney Bowes electronic inserting*, Dec. 14, 2000, www.financialexpress.com, 2 pages.

Unknown Author, *Pitney Bowes exhibits low and mid range products at IDMF*, Mar. 2002, www.pitneybowes.co.uk., 3 pages.

Internet, Pitney Bowes, *Direct Connect™ Inserter Control System*, http://www.pb.com, Apr. 5, 2002, 1 page.

Internet, Pitney Bowes, *DM 9 Series Inserting System*, http://www.pb.com, Apr. 5, 2002, 1 page.

Internet, Pitney Bowes, *Production Mail Inserters*, http://www.pb.com, Apr. 5, 2002, 2 pages.

Internet, Pitney Bowes, 5 *Series Desktop Inserting System*, http://www.pb.com, Apr. 5, 2002, 1 page.

*First Data DecisionQuest™ Service*, First Data Resources Inc., pp. 1-364.

* cited by examiner

| | | Element | Rule Operator | Value | ) | And/Or |
|---|---|---|---|---|---|---|
| ( | | | | | | |
| 1 | (( | CREDIT LINE | Greater Than Or Equal To | 4000 | | AND |
| 2 | | CURRENT BALANCE | Less Than | 6000.00 | | AND |
| 3 | | MSC FIELD 03 | Equal To | 455 | | OR |
| 4 | ( | PRODUCT TYPE | Greater Than | 123 | | AND |
| 5 | | PRODUCT TYPE | Less Than | 200 | )) | |

Business Criteria - Premium

Criteria Properties | Rules | Comments

Help / Apply / Cancel / OK

Fig. 7

AUCTION SYSTEMS AND METHODS FOR SELECTING INSERTS FOR DIRECT MAILINGS

CROSS-REFERENCES TO RELATED APPLICATIONS

This application is a Continuation-in-Part of, and claims the benefit of, commonly assigned U.S. patent application Ser. No. 10/655,818, now U.S. Pat. No. 6,895,302 entitled "Systems and Methods for Allocating Excess Space Associated With Mailings," filed on Sep. 5, 2003 by Provost, et al., which is a Continuation-in-Part of, and claims the benefit of, U.S. patent application Ser. No. 10/417,887, now U.S. Pat. No. 6,829,519 entitled "Systems for Assembling Mailings and Methods for External Control Thereof," filed on Apr. 14, 2003 by Liberty et al., the entirety of each of which are incorporated herein by reference for all purposes.

Further, the present application is related to U.S. patent application Ser. No. 10/029,122, entitled "Sheet Folding Systems & Methods", and filed on Dec. 21, 2001; U.S. patent application Ser. No. 10/045,589, entitled "System And Methods Of Providing Inserts Into Envelopes", and filed Nov. 8, 2001; U.S. patent application Ser. No. 10/036,653, entitled "Mail Handling Equipment And Methods", and filed Nov. 8, 2001; U.S. patent application Ser. No. 10/028,449 entitled "Real-Time Intelligent Packet-Collation Systems and Methods", and filed on Dec. 19, 2001; U.S. patent application Ser. No. 10/028,888, entitled "Weight Measuring Systems & Methods", and filed on Dec. 19, 2001; and U.S. patent application Ser. No. 10/232,045, entitled "Weight Measuring Systems & Methods For Weighing Items", and filed on Dec. 19, 2001. Each of the aforementioned applications are assigned to an entity common herewith, and the entirety thereof is incorporated herein by reference for all purposes.

BACKGROUND OF THE INVENTION

Embodiments of the present invention are related generally to systems and equipment used in processing mass mailings of consumer related information. More specifically, embodiments of the present invention are related to auctioning systems and methods for selecting information inserts to include with mass mailings.

A large number of companies and organizations provide direct mailings to various consumers and other recipients. These typically include a piece of information related to the particular recipient at a cost related to the weight of the piece of information and associated packaging. This approach can be costly. To spread the costs, a company sending a primary piece of information may assemble information from other venders and includes that information in with its mailings. However, excess white space and weight space of the mailing may still go unused. Thus, among other things, there exists a need in the art to address the aforementioned limitation.

Yet further, providing a large amount of irrelevant or less relevant direct mailings may cause recipients to disregard all direct mailings through believing that they are generally irrelevant and do not warrant reading. Additionally, a large amount of direct mailings are detrimental to the recipients and the public in general as they must be disposed of, and ultimately end up in land fills.

Some companies that already send direct mailings have found it advantageous to include various additional information with such mailings. As just one example, various credit card companies provide offers with statements that are sent to credit card holders. An ability to provide increased control over the recipients receiving a particular direct mailing can thus be useful to such companies. One such company, First Data Corporation, the assignee of the present invention sends millions of statements out each month to credit card users. In addition to these statements, various additional information is included with at least some of these statements. FDC has developed its First Data Decision-Quest® product that allows a credit card company processing with FDC to choose which information is to be included with a given statement.

In light of these developments, improvements are needed that allow the value of advertising space to be fully exploited.

BRIEF SUMMARY OF THE INVENTION

Embodiments of the present invention provide a method of allocating excess space associated with a primary component. The method includes determining the excess space associated with the primary component, identifying at least one information insert compatible with the excess space, providing an output advertising the excess space, and receiving a request in response to the output. The request may be based at least in part on the at least one information insert. The method also includes associating the at least one information insert with the primary component.

In some embodiments, the excess space is excess weight space, in which case associating the at least one information insert with the primary component may include sending a control signal to an insertion system that indicates the at least one information insert. The insertion system may be a multi-bay insertion system and one of the bays of the multi-bay insertion system may include the insert. The method of claim 1, wherein the excess space comprises excess white space. The primary component may be an account statement, a bill, a letter, and/or the like. The insert may be an advertisement. The request may be a first request from a first entity in which case the method may include receiving a second request from a second entity in response to the output and selecting between the first request from the first entity and the second request from the second entity to identify a selected request. The first request from the first entity may indicate a first amount to be exchanged for access to the excess space and the second request from the second entity may indicate a second amount to be exchanged for access to the excess space, in which case selecting between the first request from the first entity and the second request from the second entity to identify a selected request includes comparing the first amount to be exchanged for access to the excess space and the second amount to be exchanged for access to the excess space. The method may include access a priority definition, in which case identifying the at least one information insert compatible with the excess space may be based at least in part on the priority definition. The priority definition may include one or more elements such as a relationship between the primary component and one or more information inserts, a relationship between an entity associated with the primary component and entities associated with one or more information inserts, an amount of excess space required by one or more information inserts, and/or the like.

In still other embodiments, a system for allocating excess space associated with a primary component includes an insertion system, a primary component, and a microprocessor associated with a computer readable medium. The computer readable medium includes instructions executable by the microprocessor to determine the excess space associated with the primary component, identify at least one information insert compatible with the excess space, provide an output indicating the excess space associated with the primary component, and receive a request in response to the output indicating the excess space associated with the primary component. The request may be based at least in part on the at least one information insert. The instructions executable by the microprocessor also send a control signal to the insertion system. The control signal indicates the at least one information insert.

In other embodiments, the present invention provides systems and methods for assembling a mailing. The mailing can include one or more offer items along with one or more inserts. Various embodiments of the present invention provide for determining which inserts are to be combined with a given offer item, and then effectuating the assembly of the mailings via a computer controlled inserter. The determination of what inserts to include can be made by applying a rule set to a decision information upon reception of an external tickler. Thus, for example, the rule set can indicate that a particular insert is to be provided to all recipient's within a given zipcode that are over a defined age. As another alternative, the rule set can indicate that a recipient with a high income is to receive a heavier, more costly version of an insert. Using such an invention, the process of preparing offer items and/or inserting a defined insert set with an offer item can be computer controlled, and tailored to creating effective, direct mailings to individual recipients.

In operation, an entity other than the entity performing the assembly provides an external tickler, and in some cases one or more of a rule set and decision information. The rule set is applied to the decision information, and the results are transmitted to processing equipment including inserters, folders, printers, and/or stuffers for assembling a customized mailing for the indicated recipient.

The determined insert set can be assembled and/or folded, and associated with an offer item addressed to the recipient. To this end, a folder can be used in relation to the present invention to prepare offer items and/or inserts to be included in a particular mailing item. Thus, for example, a set of unfolded and/or unprinted offer items can be folded in preparation for insertion into envelopes by an inserter. In addition, an inserter can be used to assemble the inserts and offer items, and stuff the assembled items into an envelope.

One particular embodiment of the present invention provides a system for selecting inserts that includes a multi-bay insert holder and an offer item associated offer item holder. Such an offer item holder can be one of the insert holders or a separate device where the offer item is held. In one particular instance, the offer item holder is a conveyor belt, and the insert holder is a bay or bin loaded with a number of the inserts. The system further includes a microprocessor that can access a computer readable medium comprising software. The software is executable by the microprocessor to receive an external tickler, receive one or more decision rules, receive decision information, and upon receiving the external tickler, apply the decision rule to the decision information. In addition, the software is executable to send a control signal to the multi-bay insert holder that indicates an insert associated with the multi-bay insert holder to be associated with the offer item. In some instances, the external tickler includes an indication of a scheduled offer item for a particular recipient. Such a scheduled offer item can be, for example, an account statement, a bill, an appointment notification, or the like.

In some instances, the decision rule indicates a threshold amount of the decision information at which the insert is to be provided to the recipient. Thus, for example, a particular insert may be provided to all individuals within a particular geographic location that are over age thirty. Examples of decision information can thus include location and age information for a group of individuals. Other decision information can include, but is not limited to, a credit limit, a personal income, an account type, a credit rating, an account balance, a number of dependents, and the like. In some instances, a plurality of data points within the decision information are operated on by the decision rule. For example, some decision rules operate on both age and income, while other decision rules operate on account type and age. Based on this disclosure, one of ordinary skill in the art will appreciate a myriad of decision rules and decision information that can be used in accordance with embodiments of the present invention.

In some instances, the system includes two microprocessor based systems where one of the microprocessor based systems is locally coupled to the multi-bay insert holder, and the other is communicably coupled to the first microprocessor via a communication network. In such a system, the control signal can include a data packet provided by the communicably coupled microprocessor based system to the locally maintained microprocessor based system. In some cases, the control signal further includes an electrical signal based on the data packet and provided to the insert holder.

Other embodiments of the present invention provide methods for selecting inserts to be included with an offer item. Such methods include receiving an external tickler and a decision rule. Based on the external tickler, the decision rule is applied to a decision information to create an insert set. The insert set includes at least one insert to be associated with an offer item. In some cases, the decision information is provided from an external source, while in other cases, the decision information is provided by an entity associating the inserts with offer items. The method further includes associating the insert set with the offer item.

Yet other embodiments of the present invention provide methods for preparing customized insert sets for distribution with offer items. Such methods include providing a control interface that is operable to receive an external tickler and a decision rule in some cases, the control interface is a web page maintained by the entity associating inserts with offer items. The method further includes receiving the external tickler, and the decision rule. Based on the external tickler, the decision rule is applied to a decision information to create an insert set that includes at least one insert to be included with an offer item. The insert set is also associated with the offer item.

Some embodiments of the present invention also provide systems and methods for assembling a mailing, maximizing the benefit of the mailing, and/or distributing costs associated with the mailing. The mailing can include one or more primary components along with one or more inserts. Various embodiments of the present invention provide for determining any excess white space and/or weight space associated with a given mailing, and identifying one or more inserts and/or information that can be incorporated with the mailing. Further, in some embodiments, a competitive bid system is implemented to allow for the disposition of available white space and/or weight space.

Some embodiments of the present invention provide systems for allocating an excess space associated with a primary component to one or more information inserts. Such excess space can include excess weight of an overall mailing such that a paper (or plastic) insert can be included to fill the excess weight. Alternatively, or in addition, such excess space can include excess white space included on the primary component itself. Thus, additional printing can be included on an open white space area. Also, as used herein, a primary component can be any document or item that is scheduled to be sent to a given recipient. Thus, for example, a primary component can be a credit card, a credit card statement, an insurance bill, a utility bill, a driver's license renewal, an income tax form, or the like. Further, as used herein, an information insert can be any secondary information, document, or card provided to the recipient ancillary to the primary component. For example, an information insert can be an advertisement, an informational document, a notice, a return address envelope, an identification or value card, a false credit card provided as an incentive to obtain an actual credit card, a portion of the primary component itself including an informational or advertising message, and/or the like. Such information inserts can include an informational message printed on the associated primary component, or informational messages displayed on a separate stock and inserted with the primary component. Also, as used herein, informational messages can be text, color coding, graphics, or an otherwise communicative message.

Such allocation systems can include an insertion system, a primary component, and a microprocessor. The allocation systems further include a computer readable medium that comprises instructions executable by the microprocessor to: determine the excess space associated with the primary component; identify at least one information insert compatible with the excess space; and send a control signal to the insertion system that indicates the information insert(s) to be included. In one particular case, the insertion system is a multi-bay insertion system, and one of the bays of the multi-bay insertion system includes a type of information insert intended to occupy excess space in the form of weight space.

In some cases, the computer readable medium further comprises instructions executable by the microprocessor to provide an output indicating the excess space associated with the primary component, and to receive a request in response to the output indicating the excess space associated with the primary component. The aforementioned process of identifying the information insert(s) for inclusion can be based at least in part on the request. In particular instances, a number of requests can be received for the same identified excess space, and the instructions can be further executable to determine which of the multiple requests to service. This selection can be done, for example, by determining which of the multiple requests will provide the largest payment for use of the excess space, which of the two requests will result in an information insert being included that is complementary to the primary component, and/or the like.

In yet other cases, the computer readable medium further comprises instructions executable by the microprocessor to access a priority definition. This priority definition provides at least some of the basis for the aforementioned process of identifying the information insert(s) for inclusion. Thus, for example, such a priority definition can be used to determine which of two or more competing information inserts are selected to utilize excess space. More specifically, the priority definition can include one or more of: a relationship between the primary component and one or more information inserts; a relationship between an entity associated with the primary component and entities associated with one or more information inserts; and an amount of excess space required by one or more information inserts.

Other embodiments of the present invention provide methods for allocating excess space associated with a primary component. Such methods include determining the excess space associated with the primary component. This can be done by weighing the contents associated with a primary component and determining an amount of weight that can be added to the primary component without exceeding an increment in the postage required to send the primary component. Alternatively, or in addition, this can include identifying any open areas on the primary component. Based on this disclosure, one of ordinary skill in the art will appreciate a variety of other ways to determine excess space available in relation to a primary component. Such methods further include accessing a priority definition that includes information associated with one or more information inserts. Based at least in part on the priority definition, one or more of these information inserts can be identified as compatible with the excess space, and these identified information inserts can then be associated with a package that includes the primary component.

Yet other embodiments of the present invention provide methods for incorporating a customized information insert into an excess space. Such methods include providing a control interface that is operable to receive a request to associate an information insert into a defined excess space, and determining an actual excess space compatible with the information insert. Based at least in part on the request, the information insert associated with the request is associated with the primary component. Further, a payment amount in association with the inserted information insert can be requested from the entity for which the information insert was included.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 7 is an exemplary interface useful in relation to various embodiments of the present invention;

DETAILED DESCRIPTION OF THE INVENTION

Figure 1:
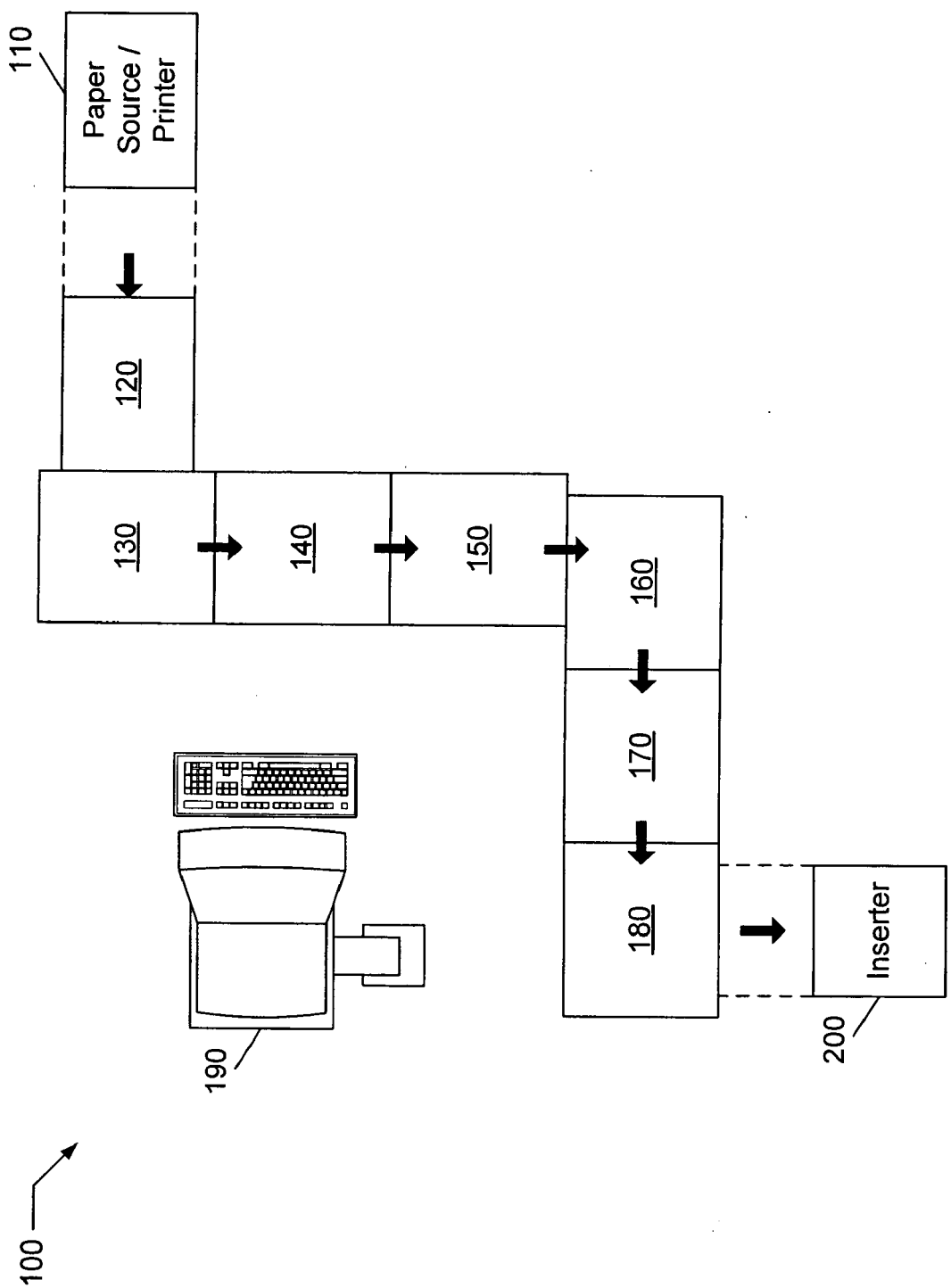
FIG. 1 is a simplified schematic of a primary component and/or insert folding system useful in relation to embodiments of the present invention.

The present invention provides systems and methods for assembling a mailing. The mailing can include one or more offer items along with one or more inserts. As used herein, an offer item can be any document or item that is scheduled to be sent to a given recipient. Thus, for example, an offer item can be a credit card, a credit card statement, an insurance bill, a phone bill, a driver's license renewal, an income tax form, or the like. As used herein, an insert can be any secondary information, document, or card provided to the recipient ancillary to the offer item. For example, an insert can be an advertisement, an informational document, a notice, an identification or value card, a false credit card provided as an incentive to obtain an actual credit card, a portion of the offer item itself including an informational of advertising message, and the like. As used herein, informational messages can be text, color coding, graphics, or otherwise communicative message.

Various embodiments of the present invention provide for determining which inserts are to be combined with a given offer item. This determination is made by applying a rule set to a decision information upon reception of an external tickler. As used herein, a rule set can be any set of rules that define a set of inserts that are to be provided to a particular recipient. For example, the rule set can indicate that a particular insert is to be provided to all recipient's within a given zipcode that are over a defined age. As another example, the rule set may include a weight limitation that indicates that all of a certain type of inserts should be included up to a given weight of the mailing. Further examples can decision based on shoe size, income, sex, past purchase history, current affiliations with groups or credit cards, or the like. Alternatively, an interface can be provided to allow definition of the rule set that provides a virtual weight of a given mailing. Thus, for recipients that do not represent a high potential for return, only a limited weight mailing may be provided, while a high potential return recipient may receive a heavier mailing. Based on the disclosure provided herein, one of ordinary skill in the art will appreciate the large number and variety of rule sets that can be defined to operate on any type of decision information. Using such an invention, the process of preparing offer items and/or inserting a defined insert set with an offer item can be computer controlled, and tailored to creating effective, direct mailings to individual recipients.

Further, as used herein, decision information is the data that determines whether a given rule set applies. Thus, in the preceding example, the decision information includes, but is not limited to, a recipient's age and address, or other characteristics or attributes. As used herein, an external tickler is trigger or event defined by an entity other than the entity responsible for performing the assembly process. Thus, for example, the present invention can include an entity providing an offer item file that includes statements to be mailed to one or more recipient's associated with the entity. In addition, the entity can provide a rule set and decision information, along with an external tickler indicating when the process of assembling and mailing should begin. As one of many advantages, using such an external tickler allows an external entity to provide an insert set based on an unlimited number of decision points, and on non-standard decision points. Such decision points can be almost any conceivable point of information in such a system triggered externally. Further, such an external tickler provides a mechanism whereby entities that are not otherwise processing on the system can access the system capabilities. Such accessing entities can thus access various efficiencies associated with postal discounts, including sophisticated weight management facilities and tools, white space management facilities and tools, as well as the various decisioning processes. These are just some of the advantages achieved through use of external triggering, and based on the disclosure provided herein, one of ordinary skill in the art will appreciate a myriad of other advantages.

Using this decision information and rule set, a computer can determine the inserts that are to be associated with the offer item. The determined insert set can be assembled and/or folded, and associated with an offer item addressed to the recipient. To this end, a folder can be used in relation to the present invention to prepare offer items and/or inserts to be included in a particular mailing item. Thus, for example, a set of unfolded and/or unprinted offer items can be folded in preparation for insertion into envelopes by an inserter.

An inserter is a system or device capable of associating one or more inserts forming an insert set with an offer item by, for example, inserting the insert set into an envelope with an offer item to create a mail item. In one embodiment of the present invention, a multi-bay inserter, i.e., an inserter with a plurality of insert holders is used. The multi-bay inserter includes a plurality of bays each holding a particular insert that forms part of the insert set to be associated with the offer item. In one particular case, the offer item is maintained in one of the bays of the inserter, in which case the offer item holder is identical to the insert holder. In other cases, the offer item is maintained in a separate area from the insert items. In operation, an envelope is conveyed past various bays of the inserter, and where the insert item in a particular bay is to be included in the mailing item, it is inserted. Otherwise, the particular insert item is not inserted.

The present invention also provides systems and methods for maximizing the benefit of the mailing, and/or distributing costs associated with the mailing. The mailing can include one or more primary components along with one or more inserts. Various embodiments of the present invention provide for determining any excess white space and/or weight space associated with a given mailing, and identifying one or more inserts and/or information that can be incorporated with the mailing. Further, in some embodiments, a competitive bid system is implemented to allow for the disposition of available white space and/or weight space.

Some embodiments of the present invention provide systems for allocating an excess space associated with a primary component. These systems can provide for determining the availability of excess space, and identifying one or more information inserts that are compatible with that excess space. Such excess space can include excess weight of an overall mailing such that a paper insert can be included to fill the excess weight. Alternatively, or in addition, such excess space can include excess white space, or open areas, on the primary component itself. Thus, additional printing can be included on the primary component at the open areas. Also, as used herein, a primary component can be any document or item that is scheduled to be sent to a given recipient. Thus, for example, a primary component can be an offer item, a credit card, a credit card statement, an insurance bill, a utility bill, a driver's license renewal, an income tax form, and/or the like. Further, as used herein, an information insert can be any secondary information, document, or card provided to the recipient ancillary to the primary component. For example, an information insert can be an advertisement, an informational document, a notice, an identification or value card, a false credit card provided as an incentive to obtain an actual credit card, a portion of the primary component itself including an informational or advertising message, and/or the like. Such information inserts can include informational messages printed on the associated primary component, or informational messages displayed on a separate stock and inserted with the primary component. Also, as used herein, informational messages can be text, color coding, graphics, or otherwise communicative message.

Such allocation systems can include an insertion system, a primary component, and a microprocessor. The allocation systems further include a computer readable medium that comprises instructions executable by the microprocessor to: determine the excess space associated with the primary component; identify at least one information insert compatible with the excess space; and send a control signal to the insertion system, that indicates the information insert(s) to be included. In one particular case, the insertion system is a multi-bay insertion system, and one of the bays of the multi-bay insertion system includes a type of information insert intended to occupy excess space in the form of weight space.

In some cases, the computer readable medium further comprises instructions executable by the microprocessor to provide an output indicating the excess space associated with the primary component, and to receive a request in response to the output indicating the excess space associated with the primary component. The aforementioned process of identifying the information insert(s) for inclusion can be based at least in part on the request. In particular instances, a number of requests can be received for the same identified excess space, and the instructions can be further executable to determine which of the multiple requests to service. This selection can be done, for example, by determining which of the multiple requests will provide the largest payment for use of the excess space, which of the two requests will result in an information insert being included that is complementary to the primary component, and/or the like.

In yet other cases, the computer readable medium further comprises instructions executable by the microprocessor to access a priority definition. This priority definition provides at least some of the basis for the aforementioned process of identifying the information insert(s) for inclusion. Thus, for example, such a priority definition can be used to determine which of two or more competing information inserts are selected to utilize excess space. More specifically, the priority definition can include one or more of: a relationship between the primary component and one or more information inserts; a relationship between an entity associated with the primary component and entities associated with one or more information inserts; and an amount of excess space required by one or more information inserts.

Other embodiments of the present invention provide methods for allocating excess space associated with a primary component. Such methods include determining the excess space associated with the primary component. This can be done by weighing the contents associated with a primary component and determining an amount of weight that can be added to the primary component without exceeding an increment in the postage required to send the primary component. Alternatively, or in addition, this can include identifying any open areas on the primary component. Based on this disclosure, one of ordinary skill in the art will appreciate a variety of other ways to determine excess space available in relation to a primary component. Such methods further include accessing a priority definition that includes information associated with one or more information inserts. Based at least in part on the priority definition, one or more of these information inserts can be identified as compatible with the excess space, and these identified information inserts can then be associated with the primary component.

Yet other embodiments of the present invention provide methods for incorporating a customized information insert into an excess space. Such methods include providing a control interface that is operable to receive a request to associate an information insert into a defined excess space, and determining an actual excess space compatible with the information insert. Based at least in part on the request, the information insert is associated with the primary component, and payment is requested from the related excess space customer for including the information insert. In some cases, an electronic file representing the information insert can be included with the request. This electronic file can be used to create the information insert.

FIG. 1 depicts a simplified schematic of a folding system 100 useful in relation to various embodiments of the present invention. System 100 includes a series of stations adapted to fold a primary component in preparation for inserting the primary component into an envelope for mailing. Primary components processed by system 100 can include one or more sheets of paper, such as a recipient billing statement, a new cardholder agreement, convenience checks, and the like. In addition, system 100 can be utilized to fold one or more inserts to be included with a primary component. As previously discussed, an insert can be an advertisement, or the like that is directed to the recipient of the primary component.

As illustrated, folding system 100 includes a receiver 130 adapted for receiving paper from a paper source 110. Paper source 110 may include, or be coupled to a printer for printing primary components and/or inserts. The printer may print, for example, alphanumeric characters to identify the recipient, the recipient's address, the recipient's billing information, and the like. The printer further may print bar codes and other identifying marks on the primary components and/or inserts. In one embodiment, paper source 110 is a continuous form paper source. In this manner, paper source 110 provides for the continuous printing of statements, convenience checks or the like for multiple recipients.

In one case, the continuous form sheet is fed into a separator 120. Separator 120 cuts or separates a primary component and/or insert to be folded from the continuous form sheet in order to, for example, distinguish one recipient's documents from another recipient's documents. Separator 120 also may remove an edge of the individual sheet, such as a perforated edge, tractor pins, or the like. Separator 120 can be, for example, a Laurenti Cutter, commercially available from EMC Document Systems, Inc., having its headquarters in Batavia, Ill. The individual sheet is received from separator 120 by a receiver 130. In this manner, a printer coupled to paper source 110 may print multiple recipient documents in series, with receiver 130 receiving documents for one recipient separately from the documents for another recipient. Receiver 130 transfers the sheet to a first folder 150, by way of a first sheet translation component 140. In another case, receiver 130 transfers the sheet directly to first folder 150.

First folder 150 performs a first fold of the paper sheet. The folded paper sheet is transferred to a second folder 180 by way of a second sheet translation component 160 and a third sheet translation component 170. As shown in FIG. 1, in one embodiment, translation components 160 and 170 are configured such that system 100 has an approximate ninety degree (90°) turn for sheets processed therethrough. In this manner, system 100 maintains a small footprint. Further, in one embodiment the ninety degree turn helps align the sheet for subsequent folds.

Second folder 180 performs a second fold of the paper sheet. In some embodiments, second folder 180 folds the sheet both a second and a third time. For example, second folder 180 may perform a half-fold of the folded sheet, a C-fold, a Z-fold, or the like. In one embodiment, an inserter system 200 is coupled to second folder 180. In this manner, the folded sheet may be transferred from second folder 180 to inserter 200 for subsequent insertion into an envelope or the like. Sheet processing times may vary through system 100. In one embodiment, the amount of time it takes a sheet received by receiver 130 to travel through system 100, including through second folder 180, is less than 0.5 seconds. In a particular embodiment, the sheet passes from receiver 130 though second folder 180 in about 140 milliseconds. System 100 is controlled by a controller 190, which is electrically coupled to system 100. Additional description of various folders useful in relation to the present invention, including the previously described folder can be found in U.S. patent application Ser. No. 10/029,122, entitled "Sheet Folding Systems & Methods", that was previously incorporated herein by reference. Based on the disclosure provided herein, one of ordinary skill in the art will appreciate that a number of folding systems and methods can be utilized in accordance with various embodiments of the present invention.

Figure 2A:
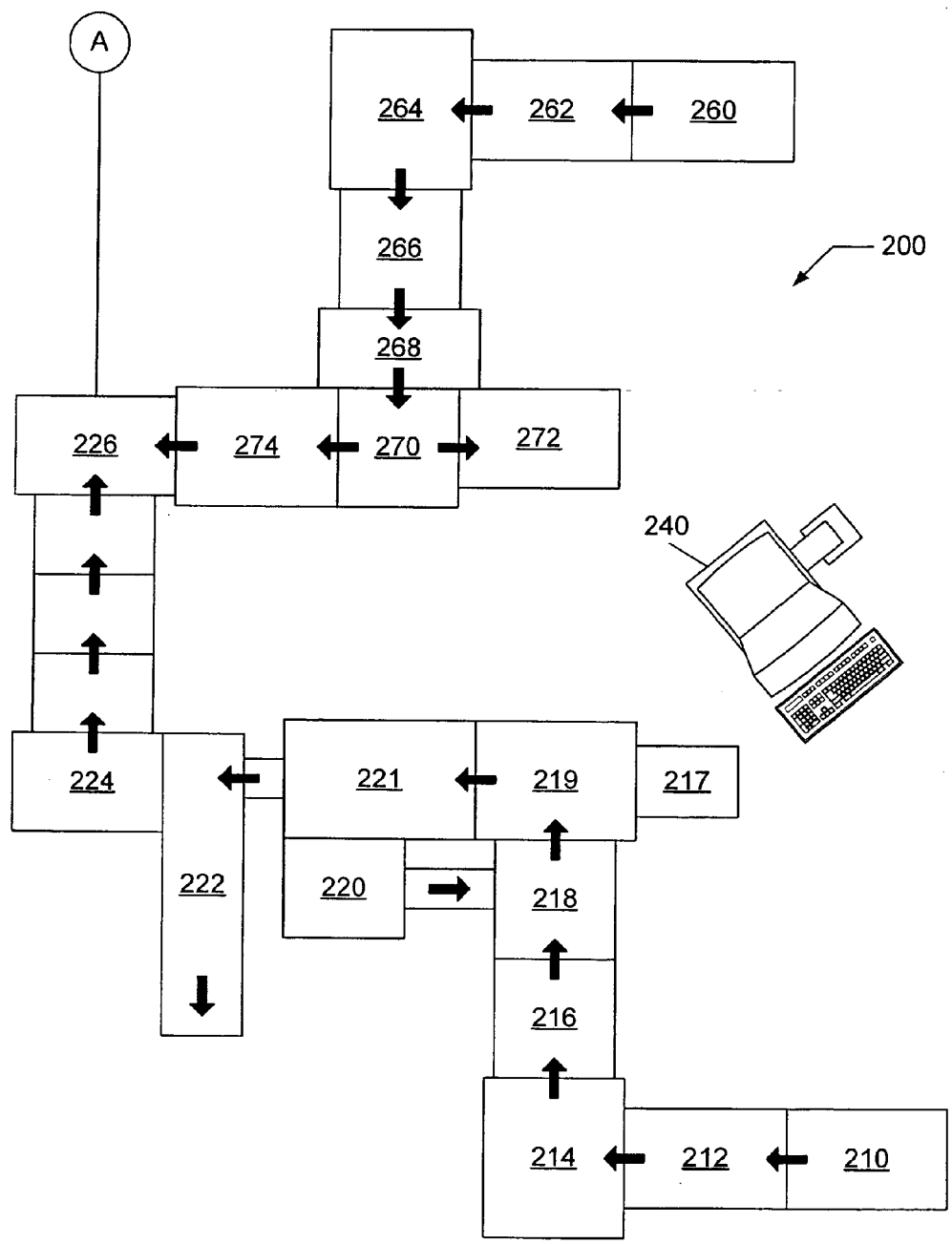
FIGS. 2A and 2B depict a simplified schematic of a mail inserting and processing system useful in relation to various embodiments of the present invention.
Figure 2B:
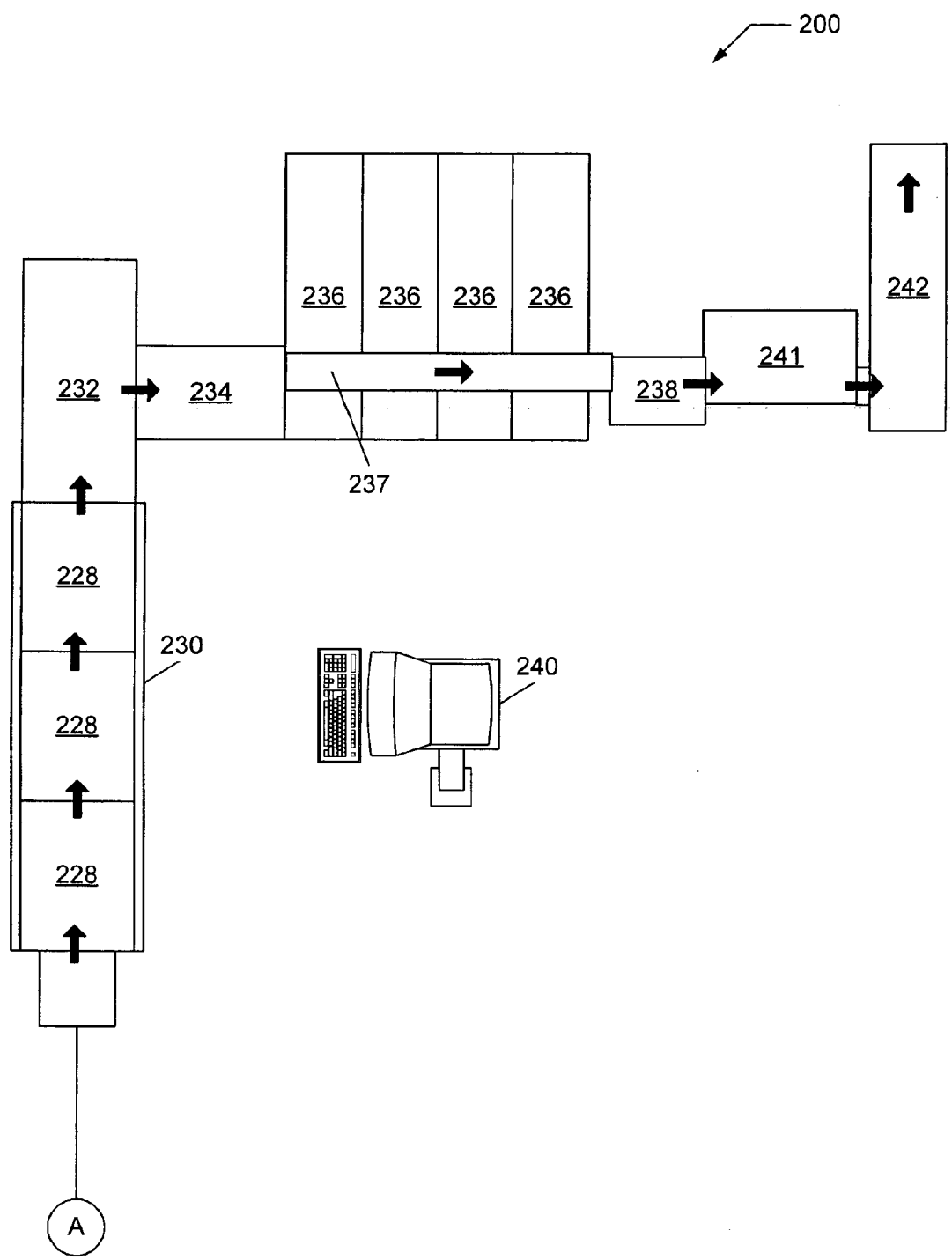

Turning now to FIG. 2, greater detail of inserter system 200 is provided. In particular, FIG. 2 depict a simplified schematic of a mail processing and inserting system 200 useful in relation to the present invention. System 200 includes a series of stations adapted to produce an envelope stuffed with a desired number of primary components and/or inserts. System 200 can either receive folded primary components and/or inserts from folding system 100, or can include printing and/or folding capability incorporated into the system. In the case shown in FIGS. 2A and 2B, system 200 includes a printer 210 adapted to print alpha numeric characters on a statement, a sheet of paper, a card carrier, or the like. Printer 210 prints information such as an account number, a customer name and mailing address, a monetary account limit, and the like, and further may print one or more bar codes. In one case, at least one of the bar codes identifies which inserts, from a plurality of different inserts, are to be sent to the customer with the statement or card.

The primary components (not shown) travel down a belt 212 and are stacked in a stacking unit 214. The primary components are then sequentially drawn from stacking unit 214 into unit 216. In one case, unit 216 includes a bar code reader for reading a bar code or other identification mark on the primary component. The bar code may, for example, identify which inserts are to be later matched up with the primary component. In another case, unit 216 also reads a number, such as a three digit number, associated with the primary component to facilitate proper matching with a card type insert having a corresponding number.

In one case, the primary component is transferred from unit 216 into unit 218. A card type insert is received from unit 220 and matched with the corresponding primary component in unit 218. In one case, the card type insert is glued, placed in slots or otherwise affixed to the primary component in unit 218. Additional details on unit 220 are described in conjunction with FIG. 3. The mated card primary component and card are transferred to unit 219. If a processing error has occurred, unit 219 deflects the card and card primary component into a bypass tray or receiving area 217. Processing errors may include, for example, mismatched cards and card primary components, and the like. If no error has occurred, unit 219 deflects the card and card primary component into a folding unit 221. As previously noted, the folding unit can be implemented separately. From the folding unit, the primary component and associated card can be forwarded a card detection assembly, that when an error is detected, such as too many cards or a missing card(s), the primary component is transferred to a bypass tray or receiving area in the direction shown by arrow 123. Transfer may occur along a conveyor belt, a track, or the like.

In one particular case, system 200 operates to place card type inserts in primary components, but is not used for processing further paper inserts. In this case, the primary component and associated card type insert(s) are passed down conveyor 222 in the direction of arrow 123, and removed from system 200. The primary components may, if desired, be transported to an envelope stuffing apparatus, a mail room or the like. In another case, system 200 operates to place paper insert sets with primary components, but not card type inserts. In yet another case, system 200 operates to place both card and paper type inserts with primary components. In such cases, if the card detection assembly does not indicate an error, primary components are then passed to a paddle wheel assembly 224 to continue processing. As shown in FIG. 1A, paddle wheel 224 operates to place the primary component and card type insert(s) on a track or conveyor belt 230. The primary components proceed down belt 230, passing under a second paddle wheel assembly 226. In one case, second paddle wheel assembly 226 places a second insert on top of the primary components as they pass underneath. For example, the second insert may be an advertisement, additional information pertinent to the recipient or the like.

As shown in FIG. 2A, a second printer 260 is adapted to print out the numerical characters and/or bar codes on an insert or a set of inserts. For example, printer 260 may further print one or more pages of advertisements or other inserts for a given recipient. In one case, printer 260 is electrically coupled to the bar code reader in unit 216. In this manner, bar code reader 216 may read the bar code or other identification mark on the primary component processed through unit 216 and inform printer 260 that an insert set is needed to be matched up with the primary component. In one case, controller 240 facilitates the communication between unit 216 and printer 260. The printed insert set passes from printer 260 along a belt 262 and into a stacking unit 264. Stacking unit 264 is similar to stacking unit 214, and performs similar functions. For example, stacking unit 264 stacks a plurality of primary components, and then passes the primary components one at a time to unit 266. Unit 266 is similar to unit 216, and may include a bar code reader for reading a bar code or other identification marks on the primary component. The insert then passes to unit 268, where the insert can be folded. The insert passes into unit 270, which in one case is a deflection unit 270 similar to unit 219 described above. Deflection unit 270 passes inserts to bypass station 272 in the event the insert is not to be matched with the present primary component. For example, bypass unit 272 receives inserts that may have been printed in error. Deflection unit 270 further directs inserts to belt 127 for transporting inserts to second paddlewheel 226. The insert is then matched with the primary component as described above.

Figure 3:
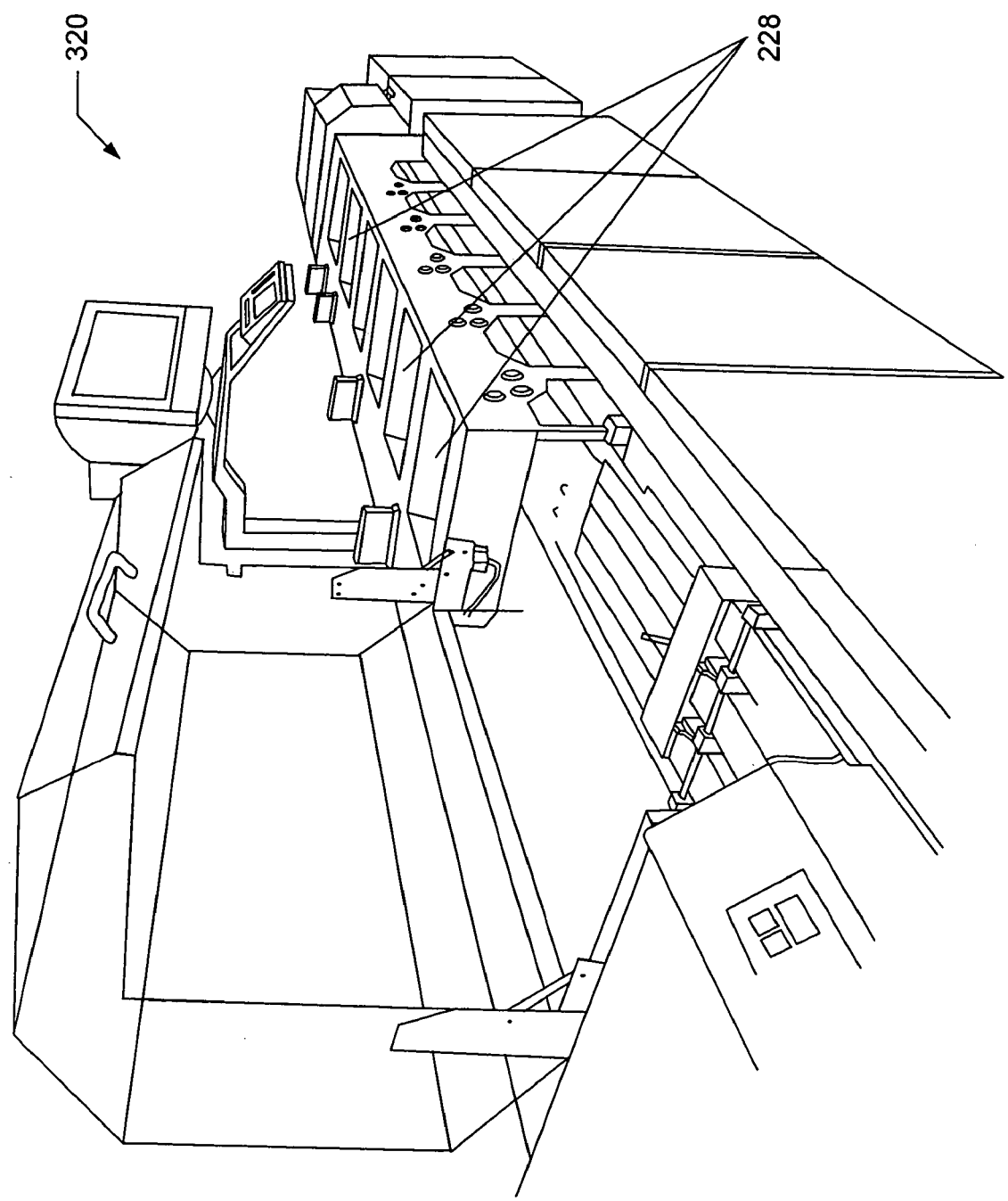
FIG. 3 is an overall view of a portion of a mail inserting and processing system of FIG. 2.

In some embodiments, printer 260 is not included as all inserts are provided from pre-prepared inserts loaded into one or more insert bays or holders 228 that can be loaded with a variety of inserts as depicted in FIG. 3. Alternatively, both printed and pre-prepared inserts can be included. The matched insert sets and primary components proceed along a track or conveyor belt 230, passing under one or more insert bays 228. FIG. 2B depicts three (3) insert bays 228, although a larger or smaller number of bays 228 also may be used within the scope of the present invention. In one particular case, system 200 includes as many as one hundred insert bays 228.

Insert bays 228 contain inserts, such as paper advertisements and informational inserts. These inserts may be added to a particular recipient's stack of primary components and/or card type inserts passing beneath on belt 230. Inserts contained within bays 228 may be selectively chosen based upon a number of criteria, including customer interest and other factors. For the system 200 shown in FIG. 2B having three bays 228, some recipients may receive all three inserts, other recipients may receive less than three inserts, while still other recipients may receive no inserts. The selected combination of inserts forms the insert set that is provided to the given recipient. In some cases, the insert set can include inserts from inert bays 228, the aforementioned card type inserts, and/or printed inserts created on printer 260.

In one case, the primary components traverse along belt 230 positioned underneath bays 228. In one case, belt 230 provides continuous, fluid movement of the statements. In another case, belt 230 provides incremental movement of the primary components, with each primary component stopping below each bin 228. Inserts desired to be matched with a particular recipient's primary component are pulled from bays 228 and placed atop the recipient's statement. Upon reaching the end of belt 230, the stack of primary components and associated inserts be sent to the recipient are transferred to unit 232 for insertion into an envelope.

The now stuffed envelope, containing a particular recipient's primary component, printed paper inserts, pre-prepared inserts, and/or card type inserts is sent to an envelope sealing unit 234. Envelope sealing unit 234 sprays a mist of water or other fluid on the envelope flap and proceeds to seal the moistened flap. Unit 234 further flips the stuffed envelope over to expose the envelope front. In one case, envelopes processed through system 200 are windowed envelopes, with information printed on the primary component or other insert exposed through the envelope window. The envelopes proceed into one or more diverters 236. Diverters 236 may divert stuffed envelopes for a variety of reasons, including, but not limited to, additional processing errors, and envelopes requiring special or additional handling. In one case, at least one diverter 236 is used for stuffed envelopes to be sent by overnight courier, such as Federal Express. In another case, at least one diverter is used to receive envelopes intended to be sent by airmail, or the like.

Envelopes intended for standard mail delivery, such as by the U.S. Postal Service First Class Delivery, are put past diverters 236 along belt or track 237 and proceed to a first postage meter 238. First postage meter 238 applies a one ounce postage to envelopes requiring only a single ounce of postage. Envelopes proceed to a second postage meter unit 240, in which a second ounce of postage is applied. Alternatively, the entire two ounce postage is applied in second postage meter station 241, with the envelope passing first postage meter station 238 without receiving postage. The envelopes have now been properly stuffed, sealed, and postaged and proceed to an output station 242. The envelopes then may be received from output station 242 for delivery to the intended customers.

System 200, in one case, includes one or more controllers 240 for monitoring and/or controlling the process through system 100. An operator may view the status of documents on the computer screen associated with a particular controller 240, and/or input data as needed into controller 240 to facilitate operation of system 200. Further, controllers 240 facilitate the coordination between printers 210, 260, bar code readers in system 200 and insert bays 228, to ensure each recipient receives the desired inset set. Additional information about an inserter similar to that previously described can be found in U.S. patent application Ser. No. 10/045,589, entitled "System And Methods Of Providing Inserts Into Envelopes," filed Nov. 8, 2001, which was previously incorporated herein for all purposes. Based on the disclosure provided herein, one of ordinary skill in the art will appreciate that a variety of inserters and/or processing systems can be used in relation to the present invention. For example, another insertion system is disclosed in U.S. patent application Ser. No. 10/036,653, entitled "Mail Handling Equipment And Methods," filed Nov. 8, 2001, and was also previously incorporated herein by reference for all purposes.

Figure 4:
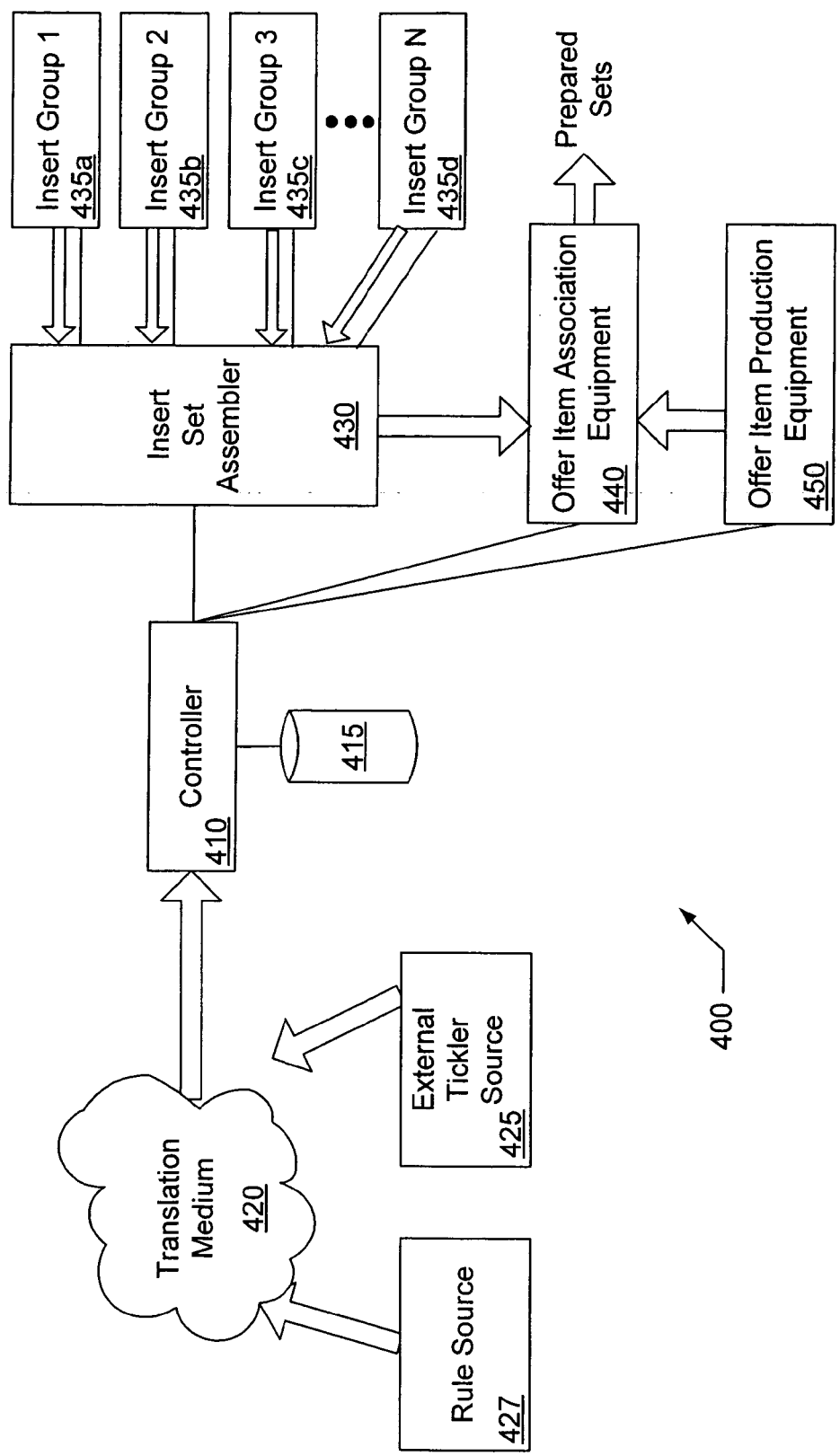
FIG. 4 is a system in accordance with embodiments of the present invention including an inserter and processor coupled to an external control set.

Turning to FIG. 4, a system 400 in accordance with embodiments of the present invention is depicted. System 400 includes a controller 410 and an associated database 415 that are in some way coupled to an external tickler source 425 and a rule source 427 via a transaction medium 420. Controller 410 can be any microprocessor based device that is capable of executing software instructions. In one embodiment, controller 410 is a personal computer (PC). Database 415 is capable of maintaining information in a format accessible to controller 410. Such information can include software instructions for operating system 400, one or more decision rules provided by rule source 427, one or more external ticklers obtained from external tickler source 425, and/or decision information. Such decision information can be provided from an external source (not shown), or maintained in relation to the entity providing controller 410. Transaction medium can be any medium capable of transmitting information from external sources to the entity maintaining controller 410. Thus, for example, transaction medium 420 can be the Internet and the entity providing controller 410 can provide one or more web pages tailored for providing information to the entity. In some embodiments, such web pages can be tailored to provide an estimated weight of primary component and associated insert set to allow for defining the rule set to assure that the maximum number of inserts are provided for a given amount of postage. Such a weight mechanism can apply the rule set to decision information, and identify the greatest number of inserts that will be included with a given primary component. Based on this, a maximum weight can be calculated and a postage associated therewith. Thus, when defining the rule set, one may take into account the postage considerations. Alternatively, or in addition, weight considerations can be included in the rule set. For example, the rule set may include an indication that only recipients with an income in excess of one amount may receive up to three ounces of inserts, while a recipient with lower income may only receive up to two ounces of inserts. In this way, a provider of inserts can maximize the return achieved through the inserts.

Alternatively, transaction medium 420 can be some other proprietary electronic network. As yet another alternative, transaction medium 420 can be a physical transfer medium. Thus, for example, electronic information may be saved to a diskette or CD ROM and sent to the entity maintaining controller 410. The entity can then upload the contained information to database 415. As another example, a paper copy of the information may be provided to the entity via transaction medium 420. This paper copy can then be translated to an electronic form and provided to database 415. Based on the disclosure provided herein, one of ordinary skill in the art will recognize a number of implementations of transaction medium 420 and methods from uploading information to database 415.

In some cases, external tickler source 425 and rule source 427 can be implemented in software. Using such software, a rule set can be defined that will be applied to decision information. In addition, an external tickler can be defined. In some cases, the external tickler is implicit in the rule set. For example, when the rule set is provided to controller 410, it is understood that the assembly of appropriate insert sets is to begin at that point, or within a reasonable time thereafter. Thus, the external tickler is actually the act of providing an order to the entity maintaining controller 410. In other cases, the external tickler can indicate a scheduled time. Thus, for example, the external tickler may be a note or electronic form indicating a time period in which the assembly process is to be performed. As a simple example, the external tickler can be a date associated with a rule set or decision information set.

In some cases, the external tickler can be provided by an entity that supplies inserts to be included with primary components that are scheduled for preparation. Thus, for example, an entity may provide an insert advertisement that it desires to be provided to all recipients of an electric bill. In this case, the rule set indicates all recipients of electric bills, and the external tickler indicates the next run of electric bills. In this way, an advertiser can use a database maintained by a provider of statements filtered through a given rules set to send desired advertisements directed to the particular recipients.

In other cases, the external tickler can be provided by an entity supplying the primary components. In some cases, the provider of inserts may pay the entity providing the primary components to send out various inserts up to a particular weight. In yet other cases, the external tickler can be provided by an entity supplying both primary components and the inserts. Sets of the inserts are assemble and associated with respective primary components on a custom basis based on the decision information and decision rules.

System 400 further includes one or more insert bays 435 that each hold a particular type of insert described as insert groups. Insert bays 435 are associated with an insert set assembler, that can be an inserter as described above, or some other type of inserter. Based on application of decision rules to decision information, it is determined which subset of inserts maintained in insert bays 435 that will be assembled into an insert set and sent to a particular recipient.

Controller 410 can apply the decision rules to the decision information, and provide the appropriate control signals to insert set assembler 430.

In addition, primary component production equipment 450, such as that described above, can prepare one or more primary components to be sent to various recipients. In some cases, the received external tickler can indicate a primary component to be prepared, and a date on which the primary component is to be sent. In various cases, the primary components are provided from an external source, and included in one of the insert bays 435, rather than be produced. In such cases, the primary component production equipment may go unused, or is not included in system 400.

Using primary component association equipment 440, primary components are associated with respective insert sets that were customized for the individual recipients of the primary components. With the primary components associated with respective insert sets, the primary components and insert sets can be stuffed into envelopes and postaged for mailing.

Figure 5:
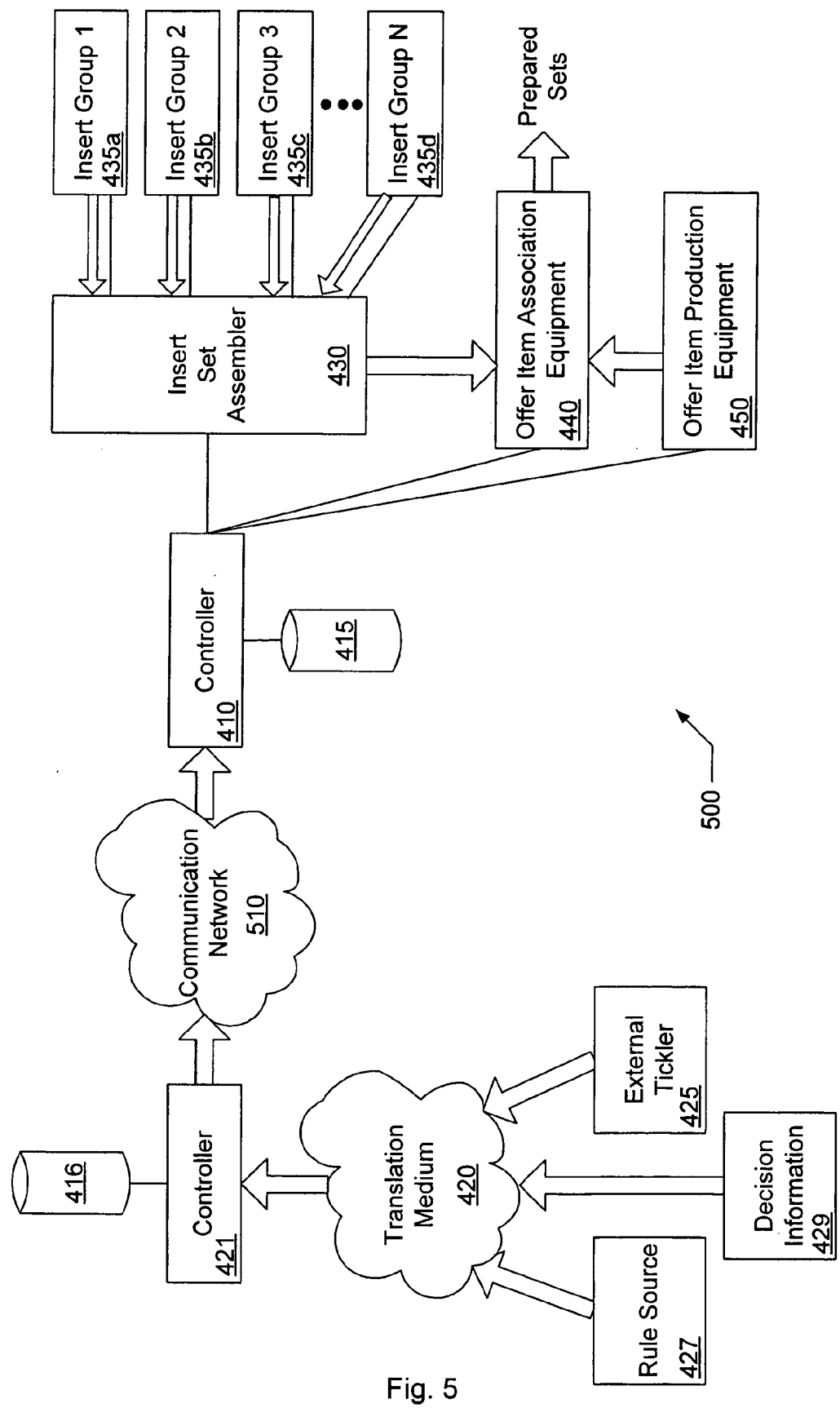
FIG. 5 is another system in accordance with various embodiments the present invention including an external controller and control set.

Turning to FIG. 5, a system 500 depicts other embodiments of the present invention. System 500 includes a communication network 510 communicably coupling controller 410 with an additional controller 421 that is associated with a database 416. In such an embodiment, controller 421 can be responsible for receiving rules sets from rule source 427, external ticklers from external tickler source 425, and/or decision information from decision information source 429 via transaction medium 420. Controller then applies the rule set to the decision information, and based on this, provides a command set to controller 410 that implements the assembly process as previously described. In some cases, controller 421 is a PC operated by an entity providing the external tickler. This PC can include software that provides for weight estimation, and a graphical user interface tailored to aid a user to define rule sets (decision rules), to format decision information, and to incorporate weight information into a rule set as previously described. Further, the software can be tailored to aid a user in designing a primary component that will be prepared using primary component production equipment 450.

Communication network 510 can be any communication network capable of providing communications between the controller 421 and controller 410. In some embodiments, communication network 510 is the Internet providing message based communication. In other embodiments, communication network 510 comprises a TCP/IP compliant virtual private network (VPN). However, it should be recognized that other communication networks could be used to provide similar functionality. For example, communication network 510 can be a local area network (LAN), a wide area network (WAN), a telephone network, a cellular telephone network, a virtual private network (VPN), the Internet, an optical network, a wireless network, or any other similar communication network or combination thereof.

Figure 6:
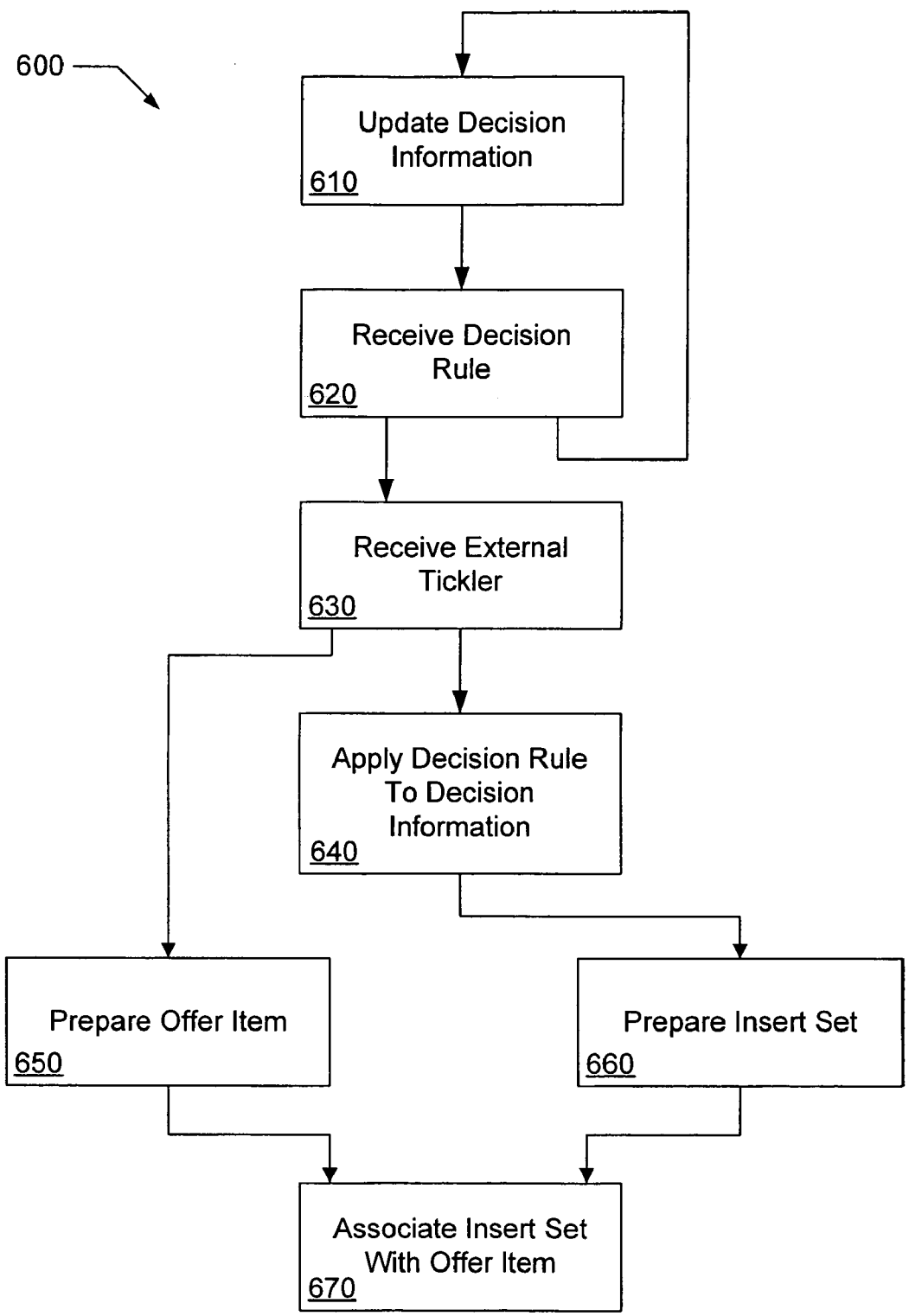
FIG. 6 is a flow diagram illustrating a method in accordance with some embodiments of the present invention.

Turning to FIG. 6, a flow diagram 600 depicting a method in accordance with some embodiments of the present invention is provided. Following flow diagram 600, decision information is updated (block 610). This can be done in a number of ways. For example, the decision information may be updated by an advertiser that is involved in market analysis and identifying potential consumers. Alternatively, this information can be updated by a credit card company, or other company providing accounts for consumers. As previously discussed, this information can include varying levels of information about a group of recipients. For example, decision information can include the age, address, income, and sex for each recipient in the group. Based on this disclosure, one of ordinary skill in the art will appreciate the myriad of data points that can be maintained about various recipients, and the various methods of gathering and updating such information.

In some embodiments of the present invention, decision information is maintained and/or gathered by the entity that is providing the decision rules and/or the external tickler. In such a case, the entity provides the decision information in addition to the decision rules. In other embodiments of the present invention, the decision information is maintained and/or updated by the entity that is responsible for assembling insert sets for inclusion with primary components as previously discussed. In such cases, the entity providing the decision rules is in effect borrowing or renting the decision information to market via inserts that are custom directed to particular recipients included within the decision information. In yet other embodiments, the decision information is gathered and/or maintained by a third party. In such a case, an entity providing decision rules and/or external ticklers can indicate the location of the third party data to be used in direct marketing to recipients indicated by the decision rules.

In addition to gathering, maintaining and/or updating decision information (block 610), decision rule information is received (block 620). As previously described, such decision rules can indicate a subset of a particular recipient pool that are to receive a prescribed type of insert(s). In some cases, a decision rule tool is provided. Such a tool can be a graphical interface tailored to help a user define one or more decision rules. In some cases, the tool provides a graphical interface allowing a user to select between more than five thousand combinations of inserts that can be tailored through a canned set of three hundred or more decision criteria operating on one hundred or more data points within the decision information. Such tailoring can assure that an insert can be provided where it will have its greatest effect, but not provided where its effect is likely to be negligible. This gets the maximum possible effect, while reducing the costs associated with direct marketing. FIG. 7 depicts one exemplary interface of a decision rule tool. Based on the disclosure provided herein, one of ordinary skill in the art will appreciate that any number of decision rule tools can be used in relation to various embodiments of the present invention.

Following flow diagram 600 of FIG. 6, the processes of defining decision rules, and those rules being received (block 620), as well as, gathering and updating decision information (block 610) are repeated as often as desired. An external tickler can be received (block 630). This external tickler, as previously described, is an indication to start the assembly process. In some cases, the receipt of the external tickler initiates application of the decision rules to the decision information (block 640) resulting in the definition of insert sets to be included with mailings to particular recipients. Controls are then formed based on application of the decision rules to cause the various insert sets to be formed (block 660). In addition, where a primary component is to be prepared, it is done (block 650). Alternatively, the primary components can be provided. The primary components are then associated with insert sets that have been customized for the recipient of the primary component (block 670).

Figure 8:
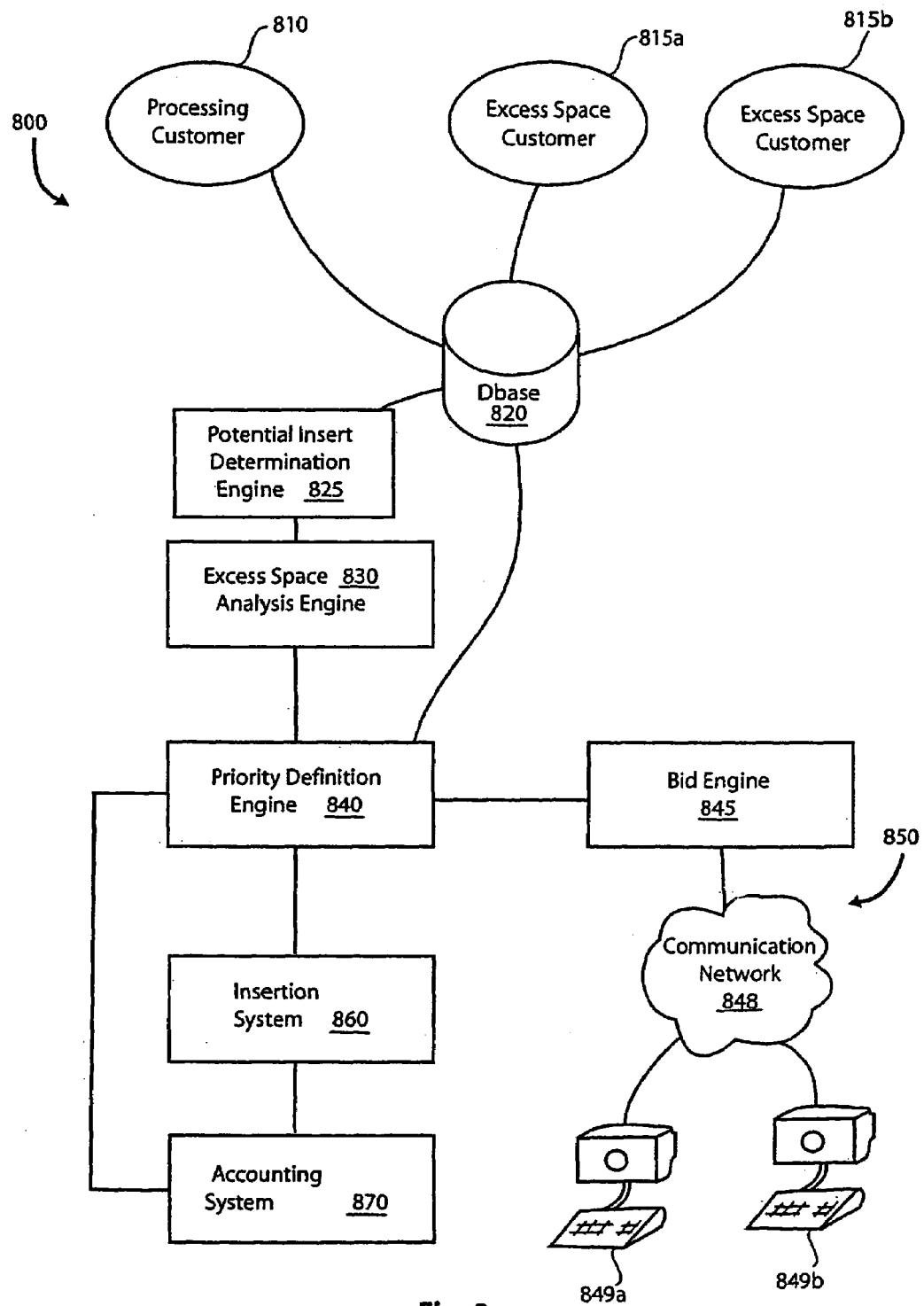
FIG. 8 is a system for allocating excess space associated with a primary component in accordance with various embodiments of the present invention.

Turning now to FIG. 8, a system 800 in accordance with some embodiments of the present invention is illustrated. System 800 can be used to allocate excess space associated with a primary component. System 800 includes a database 820 that incorporates information from one or more processing customers 810 and one or more excess space customers 815. Such processing customers 810 are customers for which primary components are sent. Thus, for example, processing customers can be, but are not limited to, banks that send primary components in the form of bank statements, credit card issuers that send primary components in the form of credit card statements, insurance companies that send primary components in the form of insurance payment statements, retailers that send primary components in the form of account statements, and/or the like. Excess space customers can be any entity that sends advertisements and/or other informational messages through direct mail. Thus, for example, an excess space customer can be a retailer sending a product advertisement and/or a service company sending a service advertisement. In some cases, an entity can be both a processing customer and an excess space customer. Based on the disclosure provided herein, one of ordinary skill in the art will appreciate the myriad of entities that can act as processing and/or excess space customers.

The information about processing customers 810 can include all information necessary to prepare and send a primary component on behalf of the processing customer. Thus, for example, where the primary component is a credit card statement, the information maintained on database 820 can include a list of credit card holders to which the primary component will be directed, a list of transactions attributable to each of the credit card holders, a date that the primary component is to be sent, logo information and layout information for the primary component, and/or the like. Specifics about the primary component including, but not limited to, the size of paper the primary component is to be printed on along with a component weight of each sheet of paper, the amount of printing to be included on the paper, the location of printing on the paper, the size of envelope in which the primary component is to be mailed, the component weight of the envelope, an indication of any inserts to be included by processing customer 810 and the component weights thereof, and the like can also be provided in database 820. In addition, the information can include a list of acceptable products and/or services that can be advertised and/or communicated in relation to a primary component from processing customer 810. Such a list can be organized in order of preference. In one particular case, a list of products and/or services is grouped into categories including highly desirable, desirable, and acceptable. Further, a group of products and/or services that cannot be included with the primary component can be included in an unacceptable category. As just one example, charitable requests may be listed as highly desirable, flower products as desirable, window cleaning services as acceptable, and free vacation advertisements as unacceptable.

Further, the information can include a list of acceptable entities and/or unacceptable entities that can providing information inserts with the primary components. Thus, for example, an entity that is complementary to the entity providing the primary component can be listed as highly desirable, while an entity that is competitive may be listed as unacceptable. A number of other entities that are neither complementary nor competitive can be included as either desirable or acceptable. Complementary entities are those entities providing services and/or products that complement the services and/or products offered by the processing customer. Thus, for example, a life insurance company may be complementary to a health insurance company. Competitive entities are those entities offering competing products and/or services to those offered by the processing customer. Thus, for example, a large insurance company offering a wide array of insurance products may be competitive with a relatively small insurance company offering only life insurance. Further, a floral services company may be neither competitive nor complementary to an insurance company acting as the processing customer. Based on the disclosure provided herein, one of ordinary skill in the art will appreciate a number of other basis upon which to grade potential products, services, information, and/or providing entities.

The aforementioned information can be combined to create a priority score. Thus, as an example, where the entity providing the information insert is a highly desirable entity, and the product advertised by an information insert is a highly desirable product, a high priority score can be given to the information insert. Alternatively, where the entity providing the information insert is unacceptable, and the service being offered on the information insert is unacceptable, a low priority score can be given. Other scores between these exemplary high and low points can be defined based on a combination of the informational message on the information insert and the entity providing the information insert. Based on this disclosure, one of ordinary skill in the art will appreciate a myriad of scoring mechanisms that can be used to combine various information and define a priority score. All of this information can be maintained on database 820.

In addition, a priority definition can be created and maintained on database 820 in relation to a primary component defined for processing customer 810. As used herein, a priority definition can be any rule or set of rules that defines the identification and/or selection of information inserts to be included with a particular primary component. Thus, for example, the priority definition may indicate that a predetermined threshold priority score must be achieved before an information insert is even considered for inclusion with the primary component. Once that predetermined priority score threshold is achieved, then whichever information insert best matches the primary component is selected. Matching may be defined as the information insert from the entity willing to pay the most to include the information insert with the primary component, the information insert having the highest priority score, the primary component best matching the excess space available with the primary component, and/or some combination of the aforementioned elements. Based on the disclosure provided herein, one of ordinary skill in the art will appreciate other priority definitions that can be used in accordance with embodiments of the present invention.

Similarly, the information about excess space customers 815 includes one or more information inserts including an identification of a product, service, charitable benefit, or the like to which the information insert is directed. Further, information about the entity offering the products and/or services is provided. This information can be used in relation to the priority scoring and priority definition as described above. Further, the information about excess space customer 815 can include an amount that the excess space customer is willing to pay to have its information insert included with a primary component. In some cases, the amount may vary based on the primary component with which the information insert is to be included. Thus, another priority score defining payment levels for inclusion with particular primary components can be implemented in relation to a particular information insert. For example, where the primary component is a credit card statement, a relatively high payment for including the information insert may be authorized, whereas a smaller payment may be authorized where the information insert is to be included with an insurance statement. This differential payment information can be incorporated into the priority definition discussed above in relation to processing customer 810. Based on this disclosure, one of ordinary skill in the art will appreciate that a number of payment tiers can be implemented in accordance with embodiments of the present invention. For example, a very high payment can be approved for inclusion with a primary component from a particular retailer, and no payment may be approved for inclusion with a primary component from another retailer.

System 800 further includes a potential information insert determination engine 825 that does a preliminary selection of a universe of excess space customers and/or information inserts that can possibly be selected for inclusion with the primary component. Thus, the one or more information inserts selected for inclusion with the primary component will be selected from this universe of excess space customers and/or information inserts.

System 800 also includes an excess space analysis engine 830. Excess space analysis engine 830 accesses database 820 and gathers information about a scheduled primary component. This information can include, for example, the size of paper the primary component is to be printed on along with a component weight of each sheet of paper, the amount of printing to be included on the paper, the location of printing on the paper, the size of envelope in which the primary component is to be mailed, the component weight of the envelope, an indication of any inserts to be included by processing customer 810 and the component weights thereof, and the like. All of this information can be utilized by excess space analysis engine 830 to determine the total weight of the primary component, and identify areas of white space remaining on the primary component.

System 800 also includes a priority definition engine 840. Priority definition engine 840 accesses the various information discussed above, and creates the priority score associated with processing customer 810 as well as the priority score associated with excess space customer(s) 815. The priority scores from processing customer 810 and excess space customer(s) 810 can then be used by priority definition engine 840 to determine the optimum information insert to be included with the analyzed primary component. Information relevant to preparing the primary component and identified information inserts are provided to an insertion system 860 that can prepare the primary component and include the selected information inserts with the primary component. This insertion system can be the multi-bay insertion system described above in relation to FIG. 3, and/or can include the systems described in relation to FIGS. 1 and 2 above. Based on this disclosure, one of ordinary skill in the art will appreciate a myriad of other insertion systems that can be used in accordance with various embodiments of the present invention.

Yet further, system 800 includes an accounting system 870 that can prepare statements indicating the charges to be demanded from excess space customer(s) 815 utilizing the determined excess space. This accounting information can be aggregated with a list of recipients of the primary component with which the information inserts were included. This statement can then be provided to the appropriate excess space customer(s) 815.

In some cases, system 800 can further include a bid system 850 for garnering price bids in relation to a particular excess space. This can be done in real time where the case warrants, or in a semi-real time environment where the bidding occurs over an extended period of time. Thus, for example, when excess space analysis engine 830 identifies some excess space associated with a group of primary components, the excess space can be advertised to one or more excess space customers 815. These excess space customers can then determine how much they are willing to pay to occupy that excess space, and that amount can be entered into database 820. This price information can replace other price information provided by the excess space customer, and this information can be used in relation to the priority score calculated for that excess space customer. Thus, when excess space analysis engine 830 is determining which information insert(s) to include with a given primary component, the updated price information can be used to make that determination. As stated, this process can occur in real time through use of an electronic communication to advertise the available excess space. In turn, customers can respond to the electronic advertisement in some limited time period with an amount they are willing to pay for the excess space. Alternatively, the bid process can occur on a delayed schedule with the analysis of the primary components occurring a week or more before the primary components are to be prepared to determine available excess space. Information about the available excess space can then be provided to potential excess space customers 815 in time for them to prepare inserts destined for excess weight space, or to prepare information to be printed on excess white space.

As illustrated, bid system 850 can include a bid engine 845 capable of preparing messages advertising available excess space, and communicating those messages via a communication network 848 to one or more microprocessor based devices 849 associated with the various excess space customers 815. Further, bid engine 845 can receive responses from excess space customer 815 indicating an amount the excess space customer 815 is willing to pay to utilize the excess space. This information can then be updated to database 820 and/or to priority definition 840. Further, bid engine 845 can be capable of receiving information relevant to preparing an information insert to be used in relation to the bid amount. Thus, in some embodiments, bid system 850 can be used to accept all information relevant to a given excess space customer 815 and/or an information insert prepared by that customer. The information received by bid system 850 can be used to supercede corresponding information that was previously updated to database 820.

Using this approach, an excess space customer 815 can set a baseline information insert and/or price to be paid, and maintain that information in database 820. When something changes, the excess space customer 815 can override database 820 without much advance notice. Further, such an approach may include providing feedback from bid engine 845 to excess space customers 815 indicating the going rate for a particular excess space. This could be provided in the form of an outbid notice. Thus, the excess space customer 815 can potentially enter a higher bid in hopes of securing the available excess space. In this way, the available excess space can be used at its highest potential, not only assuring a greater payment, but potentially also a higher read rate of the information insert. Further, because the excess space customers can be told specific information about primary components with which their information inserts are to be included, the excess space customers 815 can define a more concrete bid number, which often will be higher than if they are bidding upon a class of primary components.

Figure 9:
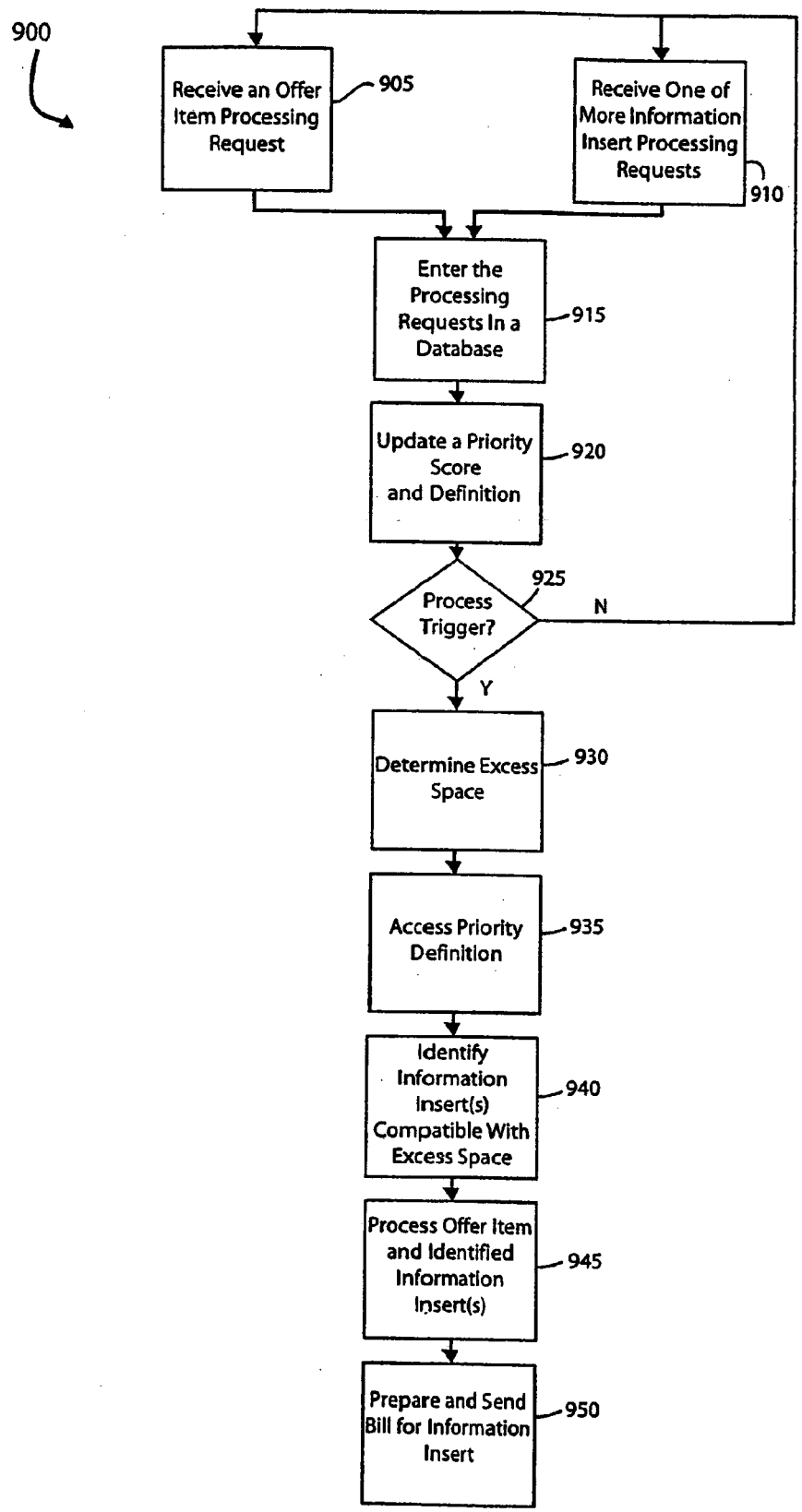
FIG. 9 is a flow diagram illustrating a method for allocating excess space in accordance with some embodiments of the present invention.

Turning now to FIG. 9, a flow diagram 900 illustrates a method for allocating excess space in accordance with some embodiments of the present invention. Following flow diagram 900, a primary component processing request is received (block 905). This can be received from a processing customer 810 and can be a one time processing request such as an informational message, or can be a recurring request such as a monthly credit card statement. In addition, one or more information insert processing requests can be received from excess space customer(s) 815 (block 910). The processing requests from both processing customers 810 and excess space customers 815 are entered into database 820 (block 915). This information is used to update the priority scores and definitions associated with each of the processing customer(s) and the excess space customer(s) (block 920).

A process trigger is awaited (block 925). Such a process trigger can be a scheduled date on which a particular primary component is to be produced, an external tickler, or the like. As used herein, an external tickler is trigger or event defined by an entity other than the entity responsible for performing the assembly process of primary components and information inserts. Where a process trigger is received (block 925), the excess space associated with a primary component is determined (block 930). This can be done by calculating the weight of all elements associated with the primary component to determine excess weight space, and/or identifying open areas or excess white space associated with the primary component by analyzing open space on the particular primary component. Excess weight space may be determined by aggregating the weight of each element included with the primary component, and subtracting that weight from the next incremental weight on the postage scale. Thus for example, if it costs a defined amount to send a mailing weighing one ounce, and the calculated weight of the primary component is one half of an ounce, the excess weight is one half of an ounce. Additional information about weighing systems and methods for weighing that can be used in relation to the present invention are disclosed in U.S. patent application Ser. No. 10/028,888, entitled "Weight Measuring Systems & Methods", and filed on Dec. 19, 2001; and U.S. patent application Ser. No. 10/232,045, entitled "Weight Measuring Systems & Methods For Weighing Items", and filed on Dec. 19, 2001. Each of the aforementioned patent applications were previously incorporated herein by reference for all purposes.

The priority definition is then accessed (block 935) along with information about various information inserts. Using this information, one or more information inserts are identified to utilize the excess space (block 940). In some cases, this can be one or more information inserts from the same excess space customer 815. Further, one or more of the information inserts can be a white space insert, while one or more other information inserts can be weight space inserts. Alternatively, the identified information inserts may include one or more information inserts from one excess space customer 815, and one or more other information inserts from another excess space customer 815.

The primary component and identified information inserts are then processed and/or assembled by an insertion system (block 945). This can include inserting weight space information inserts using a multi-bay inserter, and/or printing white space information inserts onto the primary component. These prepared packages of information insert(s) and primary component are sent to the intended recipients of the primary components. Then, a bill requesting payment for sending the information inserts is prepared and sent to the excess space customer(s) 815 for which the operation was performed (block 950).

Figure 10:
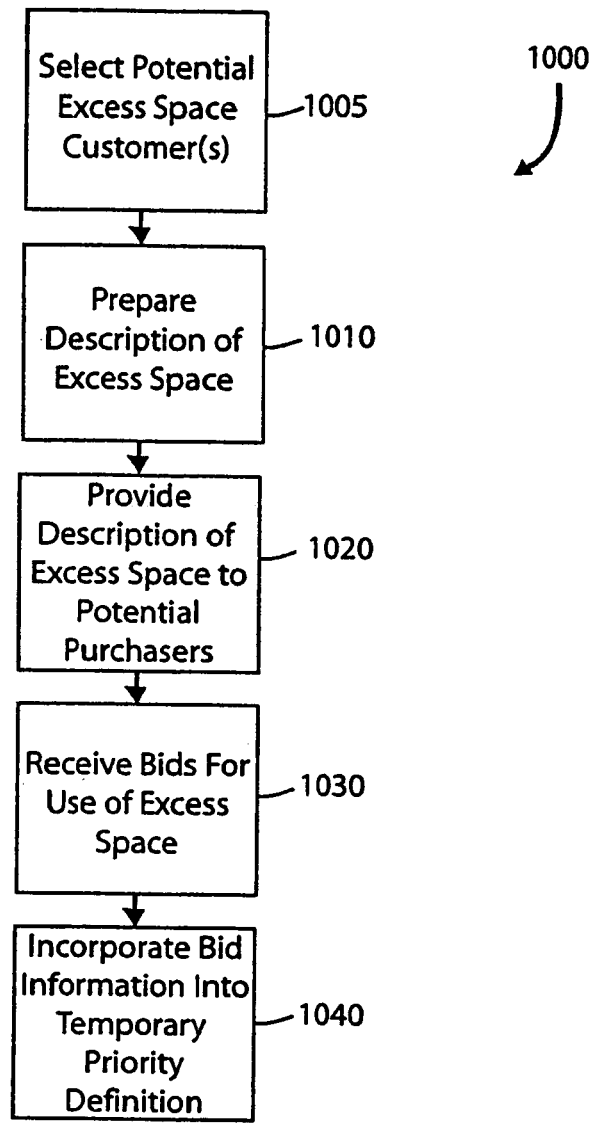
FIG. 10 is a flow diagram illustrating a competitive bid process in relation to allocating excess space in accordance with some embodiments of the present invention.

Turning now to FIG. 10, a flow diagram 1000 illustrates a competitive bid process that can be used in relation to allocating excess space in accordance with some embodiments of the present invention. Flow diagram 1000 could be implemented, for instance, between blocks 930 and 935 of flow diagram 900. Following flow diagram 1000, an initial determination is made to select potential excess space customers (block 1005). Thus, for example, a processing customer for which the primary component is being mailed may indicate that a particular excess space customer is not acceptable. Accordingly, an advertisement for available excess space associated with the processing customer will not be provided to the excluded excess space customer.

In addition, a description of excess space identified in block 930 is prepared (block 1010). This description can include, but is not limited to, an indication of excess weight space available, an indication of excess white space available, an indication of the type of primary component, and/or an indication of the processing customer 810 issuing the primary component. This description information can then be sent to one or more potential excess space customers (block 1020). In some cases, this description information is disseminated by email or some other form of electronic communication such as posting the information on a website.

In addition, one or more bids requesting some or all of the excess space can be received (block 1030). This bid information can be incorporated into database 820 on a temporary basis where it can be used in relation to determining the compatible information inserts as described in relation to block 940 (block 1040). Based on this disclosure, one of ordinary skill in the art will recognize that this bid process can be iterative allowing multiple excess space customers 815 to compete for the advertised excess space, and for excess space customers to enter progressively larger bids to assure access to the advertised excess space.

In a specific example of a competitive bid process that can be used in relation to allocating excess space, assume a billing statement client to have 500,000 active accounts that qualify as families with young children or families expecting a newborn. An automobile manufacturer wants to buy ad space on billing statements to these accounts to promote its new mini-van. The space is made available to a number of such automobile manufacturers via an auction. All potential bidders are apprised of the date, time and rules of the auction via an on-line real-time application. The auction is conducted on-line in real-time and the highest bidder wins the ad space. The ad is in full color and on the actual billing statement.

In another specific example, several few billing statement clients join a coop where their accounts are grouped to maximize ad space. The coop signs up for receiving data triggers from a 3rd party consumer data company. One of these triggers identifies new homeowners within the past week. The coop identifies 75,000 active accounts that qualify as new movers in the last week. A home improvement retailer would like to send letters with $50 coupons for their latest promotional item. There are other home improvement retailers that would like a chance to buy that letter opportunity with category exclusivity especially since the trigger data is so timely (within the past week). Potential bidders are notified of the date, time and rules of the auction event. The auction is conducted on-line real-time and the highest bidder wins the advertising correspondence.

The invention has now been described in detail for purposes of clarity and understanding. However, it will be appreciated that certain changes and modifications may be practiced within the scope of the appended claims. For example, the present invention has been discussed in relation to particular folding and insertions systems, however, various other of such systems can be used in relation to the present invention. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method of allocating excess space associated with a primary component, the method comprising:
   determining the excess space associated with the primary component;
   identifying at least one information insert compatible with the excess space;
   providing an output advertising the excess space;
   receiving a request in response to the output, wherein the request is based at least in part on the at least one information insert; and
   associating the at least one information insert with the primary component.

2. The method of claim 1, wherein the excess space comprises excess weight space.

3. The method of claim 2, wherein associating the at least one information insert with the primary component comprises sending a control signal to an insertion system, wherein the control signal indicates the at least one information insert, wherein the insertion system is a multi-bay insertion system, and wherein one of the bays of the multi-bay insertion system includes the insert.

4. The method of claim 1, wherein the excess space comprises excess white space.

5. The method of claim 1, wherein the primary component is selected from a group consisting of:
   an account statement;
   a bill; and
   a letter.

6. The method of claim 1, wherein the insert is an advertisement.

7. The method of claim 1, wherein the request is a first request from a first entity, and wherein the method further comprises:
   receiving a second request from a second entity in response to the output; and
   selecting between the first request from the first entity and the second request from the second entity to identify a selected request.

8. The method of claim 7, wherein the first request from the first entity indicates a first amount to be exchanged for access to the excess space, wherein the second request from the second entity indicates a second amount to be exchanged for access to the excess space, and wherein selecting between the first request from the first entity and the second request from the second entity to identify a selected request comprises comparing the first amount to be exchanged for access to the excess space and the second amount to be exchanged for access to the excess space.

9. The method of claim 1, further comprising:
   access a priority definition, wherein identifying the at least one information insert compatible with the excess space is based at least in part on the priority definition.

10. The method of claim 1, wherein the priority definition includes one or more elements selected from a group consisting of:
   a relationship between the primary component and one or more information inserts;

a relationship between an entity associated with the primary component and entities associated with one or more information inserts; and an amount of excess space required by one or more information inserts.

11. A system for allocating excess space associated with a primary component, the system comprising:
   an insertion system;
   a primary component; and
   a microprocessor associated with a computer readable medium, wherein the computer readable medium comprises instructions executable by the microprocessor to:
      determine the excess space associated with the primary component;
      identify at least one information insert compatible with the excess space;
      provide an output indicating the excess space associated with the primary component;
      receive a request in response to the output indicating the excess space associated with the primary component, wherein the request is based at least in part on the at least one information insert; and
      send a control signal to the insertion system, wherein the control signal indicates the at least one information insert.

12. The system of claim 11, wherein the information insert is a white space insert.

13. The system of claim 11, wherein the information insert is a weight space insert.

14. The system of claim 13, wherein the insertion system is a multi-bay insertion system, and wherein one of the bays of the multi-bay insertion system includes the weight space insert.

15. The system of claim 11, wherein the primary component is selected from a group consisting of:
   an account statement;
   a bill; and
   a letter.

16. The system of claim 11, wherein the information insert comprises an advertisement.

17. The system of claim 11, wherein the request is a first request from a first entity, and wherein the computer readable medium further comprises instructions executable by the microprocessor to:
   receive a second request from a second entity in response to the output; and
   select between the first request from the first entity and the second request from the second entity to identify a selected request.

18. The system of claim 17, wherein the first request from the first entity indicates a first amount to be exchanged for use of the excess space, wherein the second request from the second entity indicates a second amount to be exchanged for use of the excess space, and wherein selecting between the first request from the first entity and the second request from the second entity to identify a selected request comprises comparing the first amount to be exchanged for use of the excess space and the second amount to be exchanged for use of the excess space.

19. The system of claim 11, wherein the computer readable medium further comprises instructions executable by the microprocessor to:
   access a priority definition, wherein identifying the at least one information insert compatible with the excess space is based at least in part on the priority definition.

20. The system of claim 19, wherein the priority definition includes one or more elements selected from a group consisting of:
   a relationship between the primary component and one or more information inserts;
   a relationship between an entity associated with the primary component and entities associated with one or more information inserts; and
   an amount of excess space required by one or more information inserts.

* * * * *